(12) United States Patent
Kang et al.

(10) Patent No.: US 10,845,919 B2
(45) Date of Patent: Nov. 24, 2020

(54) TOUCH DISPLAY DEVICE, TOUCH SENSING SYSTEM, AND TOUCH SENSING METHOD

(71) Applicant: LG Display Co., Ltd., Seoul (KR)

(72) Inventors: Seongkyu Kang, Gyeonggi-do (KR); HongChul Kim, Gyeonggi-do (KR); SungYub Lee, Seoul (KR)

(73) Assignee: LG DISPLAY CO., LTD, Seoul (KR)

(*) Notice: Subject to any disclaimer, the term of this patent is extended or adjusted under 35 U.S.C. 154(b) by 299 days.

(21) Appl. No.: 15/836,583

(22) Filed: Dec. 8, 2017

(65) Prior Publication Data

US 2018/0164950 A1    Jun. 14, 2018

(30) Foreign Application Priority Data

Dec. 12, 2016    (KR) .................. 10-2016-0168298

(51) Int. Cl.
| | | |
|---|---|---|
| *G06F 3/042* | (2006.01) | |
| *G06F 3/041* | (2006.01) | |
| *G06K 9/00* | (2006.01) | |

(52) U.S. Cl.
CPC .......... *G06F 3/0421* (2013.01); *G06F 3/0412* (2013.01); *G06K 9/0004* (2013.01)

(58) Field of Classification Search
None
See application file for complete search history.

(56) References Cited

U.S. PATENT DOCUMENTS

| 8,575,530 B2* | 11/2013 | Chan ................... G09G 3/3233 |
| | | 250/208.1 |
| 2002/0054394 A1* | 5/2002 | Sasaki ............... G06K 9/00899 |
| | | 358/514 |

(Continued)

FOREIGN PATENT DOCUMENTS

| CN | 101251780 A | 8/2008 |
| CN | 105093611 A | 11/2015 |

(Continued)

OTHER PUBLICATIONS

Office Action dated Dec. 2, 2019 issued in a corresponding United Kingdom Patent Application No. 1720665.7.

(Continued)

*Primary Examiner* — Krishna P Neupane
(74) *Attorney, Agent, or Firm* — Polsinelli PC

(57) ABSTRACT

The present disclosure relates to a touch display device, a touch sensing system, and a touch sensing method. More specifically, touch information (fingerprint information or touch position information) may be acquired in response to current flowing in a data line through a touch sensing mode period that includes: a first period in which an optical sensor, the opposite ends of which are connected to a source node and a drain node of a switching transistor, is disposed in a pixel region, a gate signal of a turn-on level voltage is supplied to a gate line and a driving voltage is supplied to the data line; and a second period in which a gate signal of a turn-off level voltage is supplied to the gate line, a reference voltage is supplied to the data line, and an optical sensor is irradiated with light. According to the present disclosure, it is possible to accurately sense a touch position and/or a fingerprint in an optical manner using an optical sensor without being influenced by parasitic capacitance.

29 Claims, 18 Drawing Sheets

(56) References Cited

U.S. PATENT DOCUMENTS

| | | | |
|---|---|---|---|
| 2008/0198143 A1 | 8/2008 | Kinoshita et al. | |
| 2010/0039406 A1* | 2/2010 | Lee | G02F 1/13338 345/174 |
| 2010/0188332 A1 | 7/2010 | Orsley | |
| 2011/0018815 A1 | 1/2011 | Han et al. | |
| 2012/0293460 A1 | 11/2012 | Liu | |
| 2016/0148036 A1* | 5/2016 | Kim | G06K 9/00046 382/124 |
| 2017/0003770 A1* | 1/2017 | Akhavan Fomani | G06F 3/044 |

FOREIGN PATENT DOCUMENTS

| | | |
|---|---|---|
| CN | 105183252 A | 12/2015 |
| CN | 106095211 A | 11/2016 |
| GB | 2559251 A | 8/2018 |

OTHER PUBLICATIONS

Combined Search and Examination Report dated Jun. 15, 2018 issued in the corresponding United Kingdom Patent Application No. GB1720665.7, pp. 1-5.
Chinese Office Action dated Sep. 3, 2020 issued in Patent Application No. 201711127404.7 w/English Translation (11 pages).

* cited by examiner

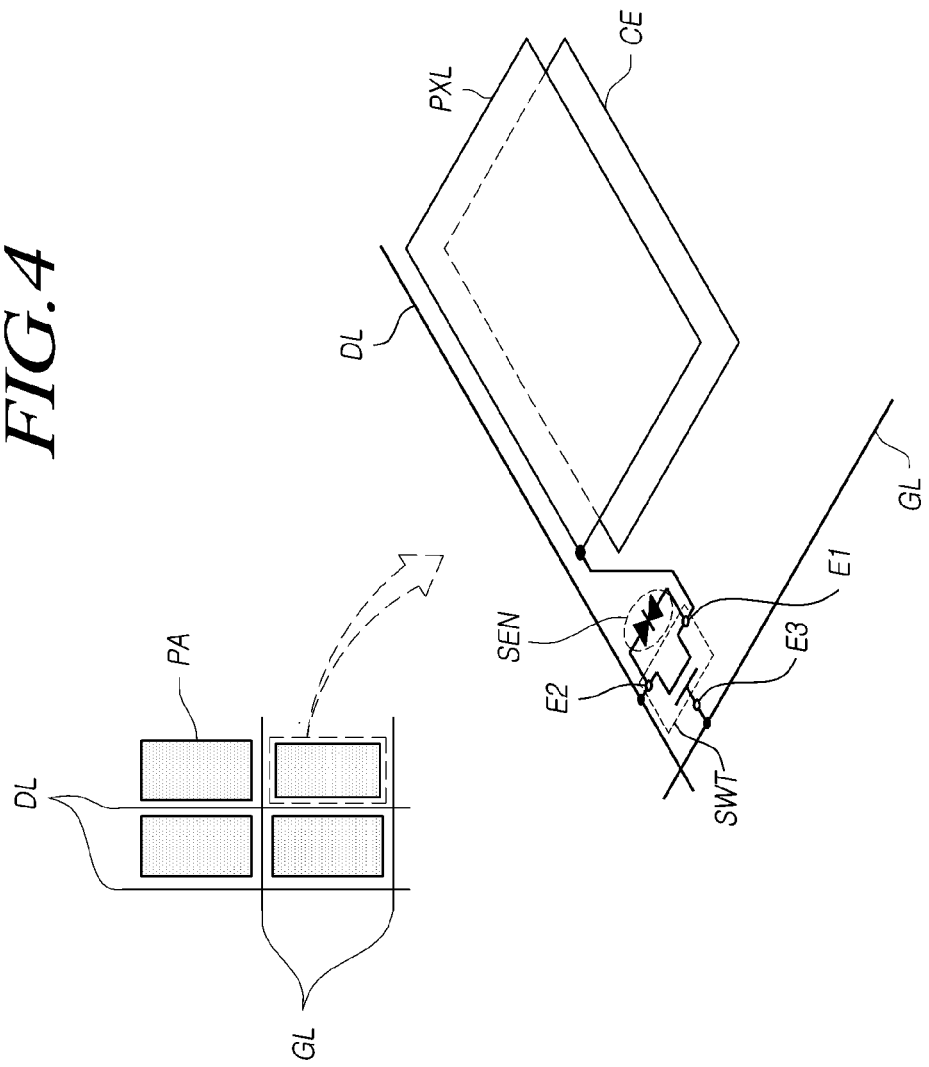

TOUCH DISPLAY DEVICE, TOUCH SENSING SYSTEM, AND TOUCH SENSING METHOD

CROSS REFERENCE TO RELATED APPLICATION

This application claims priority from Korean Patent Application No. 10-2016-0168298, filed on Dec. 12, 2016, which is hereby incorporated by reference for all purposes as if fully set forth herein.

BACKGROUND

Field of the Disclosure

The present disclosure relates to a display device and more particularly, to a touch display device, a touch sensing system, and a touch sensing method.

Description of the Background

With the development of the information society, demand for display devices for displaying images in various forms has increased. Recently, various types of display devices, such as a liquid crystal display (LCD) device, a plasma display panel (PDP) device, and an organic light-emitting display (OLED) device, have been utilized.

Among such display devices, there is a touch display device capable of providing a touch-based input system that enables a user to easily input information or a command intuitively and conveniently without using conventional input systems, such as a button, a keyboard and a mouse.

In order for the touch display device to provide such a touch-based input system, it is necessary to determine whether or not a user is performing touch input, and to correctly detect the touch coordinates (i.e., touch position).

Meanwhile, recently, some touch display devices have begun to utilize a fingerprint, which is biometric information, as user authentication means for on-line banking, product purchase, application purchase, download, and the like.

For various application functions, such a touch display device senses a user's fingerprint and compares the sensed fingerprint with a previously stored fingerprint in order to perform user authentication.

As described above, in order to accurately perform various application functions, the touch display device should be able to accurately sense a touch position or a fingerprint.

However, in a conventional touch display device, a predetermined driving voltage is mainly applied to an electrode corresponding to a touch sensor, and a touch position or a fingerprint is sensed based on a capacitance generated between the touch sensor and the finger or another electrode.

When the touch position or the fingerprint is sensed based on capacitance, a problem occurs in that a touch sensing accuracy deteriorates due to parasitic capacitance that is unnecessary for the touch sensing.

In addition, when a touch location or a fingerprint is sensed in a specific region, sensing based on the capacitance may be impossible due to a structural or circuitry issues in some instances.

Further, in the conventional touch sensing technology, since it is necessary to form a plurality of touch sensors on a touch screen panel or to form a display panel incorporating a plurality of touch sensors, there are problems in that a panel manufacturing process is complicated, and in that the thickness of the panel is also increased.

SUMMARY

In view of the foregoing, aspects disclosed herein is to provide a touch display device, a touch sensing system, and a touch sensing method that are capable of accurately sensing a touch position and/or a fingerprint in an optical manner.

Another aspect is to provide a touch display device, a touch sensing system, and a touch sensing method that are capable of accurately sensing a touch position and/or a fingerprint without being affected by parasitic capacitance.

Still another aspect is to provide a touch display device, a touch sensing system, and a touch sensing method that are capable of efficiently performing the driving of sensing of a touch position and/or a fingerprint.

Still another aspect is to provide a touch display device, a touch sensing system, and a touch sensing method that enable low-voltage driving for sensing a touch position and/or a fingerprint.

Still another aspect is to provide a touch display device, a touch sensing system, and a touch sensing method that are capable of raising a touch sensing frequency for sensing a touch position and/or a fingerprint.

Yet another aspect is to provide a touch display device, a touch sensing system, and a touch sensing method that are capable of accurately sensing a touch position and/or a fingerprint without separately providing a touch sensor having a large size.

Yet another aspect is to provide a touch display device, a touch sensing system, and a touch sensing method that are capable of performing a switching function for driving a display and a sensor function for sensing a touch position and/or a fingerprint using a single structure.

In a further aspect thereof, a touch display device includes a display panel in which a data line and a gate line are arranged, and a pixel electrode defined by the data line and the gate line is disposed in a pixel region; and a gate driving circuit configured to supply a gate signal to the gate line.

In the touch display device, the pixel region may include a switching transistor controlled by a gate signal applied to a gate node through the gate line, and electrically connected between the data line and the pixel electrode, and an optical sensor, the opposite ends of which are connected to a source node and a drain node of the switching transistor, respectively.

In the touch display device, a touch sensing mode period may include a first period in which a gate signal of a turn-on level voltage is supplied to the gate line and a driving voltage is supplied to the data line, and a second period in which a gate signal of a turn-off level voltage is supplied to the gate line, a reference voltage is supplied to the data line, and the optical sensor is irradiated with light.

The touch display device may further include a touch sensing circuit electrically connected to the data line and configured to acquire touch information (fingerprint information or touch position information) in response to a current flowing in the data line.

The touch display device may comprise a plurality of pixel regions in each of which the optical sensor is disposed, and the pixel regions may be distributed over the entire region or a partial region of the display panel.

The reference voltage may be a DC voltage.

In the case in which the reference voltage is the DC voltage, the driving voltage may alternate between a first driving voltage and a second driving voltage, which have opposite polarities.

In the case where the reference voltage is the DC voltage, the pixel electrode may alternate between a state in which the first driving voltage is applied thereto, a state in which the reference voltage is applied thereto, a state in which the second driving voltage is applied thereto, and the state in which the reference voltage is applied thereto.

In the case where the reference voltage is the DC voltage, the reference voltage may have a touch sensing frequency corresponding to ½ of a display driving frequency.

The reference voltage may be an AC voltage alternating between a first reference voltage and a second reference voltage.

In the case where the reference voltage is the AC voltage, the driving voltage may be supplied only once during an initial frame period with the same polarity.

In the case where the reference voltage is the AC voltage, the pixel electrode may alternate between the state in which the first reference voltage is applied thereto and the state in which the second reference voltage is applied thereto, starting from the state in which the driving voltage is applied thereto.

In the case where the reference voltage is the AC voltage, the reference voltage may have a touch sensing frequency corresponding to a display driving frequency.

In another aspect, the aspects may provide a touch sensing method of a touch display device including a display panel in which a data line and a gate line are arranged, and which includes a pixel region in which a pixel electrode defined by the data line and the gate line and a switching transistor are disposed, the switching transistor being controlled by a gate signal applied to a gate node through the gate line, and being electrically connected between the data line and the pixel electrode.

The touch sensing method may include: a first pixel charging step of supplying a gate signal of a turn-on level voltage to the gate line and supplying a first driving voltage to the data line; and a first current leakage step of supplying a gate signal of a turn-off level voltage to the gate line, supplying a reference voltage to the data line, and irradiating an optical sensor, opposite ends of which are respectively connected to a source node and a drain node of the switching transistor, with light.

After the first current leakage step, the touch sensing method may further include a first pixel charge sensing step of sensing a charge between the pixel electrode and a common electrode by supplying a gate signal of a turn-on level voltage to the gate line.

The reference voltage may be a DC voltage or an AC voltage.

In the case where the reference voltage is the DC voltage, after the first pixel charge sensing step, the touch sensing method may further include: an intermediate step of supplying the gate signal of the turn-off level voltage to the gate line; a second pixel charging step of supplying the gate signal of the turn-off level voltage to the gate line and supplying a second driving voltage to the data line; and a second current leakage step of supplying the gate signal of the turn-off level voltage through the gate line, supplying the reference voltage to the data line, and irradiating the optical sensor with the light; and a second pixel charge sensing step of sensing a charge between the pixel electrode and a common electrode by supplying a gate signal of a turn-on level voltage to the gate line.

In the case where the reference voltage is the DC voltage, a polarity of the first driving voltage and a polarity of the second driving voltage may be opposite each other.

In the case where the reference voltage is the DC voltage, a voltage difference between the first driving voltage and the reference voltage may correspond to a voltage difference between the reference voltage and the second driving voltage.

In the case where the reference voltage is the DC voltage, the first pixel charging step, the first current leakage step, the first pixel charge sensing step, the intermediate step, the second pixel charging step, the second current leakage step, and the second pixel charge sensing step may be performed for four frame periods. In addition, the touch information may be obtained twice during the four frame periods.

In the case where the reference voltage is the DC voltage, while the first pixel charging step, the first current leakage step, the first pixel charge sensing step, the intermediate step, the second pixel charging step, the second current leakage step, and the second pixel charge sensing step are performed, the pixel voltage of the pixel electrode may be changed in the order of the first driving voltage, the reference voltage, the second driving voltage, and the reference voltage.

In the case where the reference voltage is the AC voltage, after the first pixel charge sensing step, the touch sensing method may further include: a second current leakage step of supplying the gate signal of the turn-off level voltage through the gate line, supplying the reference voltage to the data line, and irradiating the optical sensor with the light; and a second pixel charge sensing step of sensing a charge between the pixel electrode and a common electrode by supplying a gate signal of a turn-on level voltage to the gate line.

In the case where the reference voltage is the AC voltage, the reference voltage in the first current leakage step may be a first reference voltage, the reference voltage in the second current leakage step may be a second reference voltage, the polarity of the first reference voltage may be opposite the polarity of the first driving voltage, and the polarity of the second reference voltage may be opposite the polarity of the first reference voltage.

In the case where the reference voltage is the AC voltage, a voltage difference between the first driving voltage and the first reference voltage may correspond to a voltage difference between the second reference voltage and the first reference voltage.

In the case where the reference voltage is the AC voltage, the first pixel charging step, the first current leakage step, the first pixel charge sensing step, the second current leakage step, and the second pixel charge sensing step may be performed for two frame periods.

In the case where the reference voltage is the AC voltage, while the first pixel charging step, the first current leakage step, the first pixel charge sensing step, the second current leakage step, and the second pixel charge sensing step are performed, the pixel voltage of the pixel electrode may be changed in the order of the first driving voltage, the first reference voltage, and the second reference voltage.

In still another aspect, a touch sensing system of a touch display device includes a display panel in which a data line and a gate line are arranged, and which includes a pixel region in which a pixel electrode defined by the data line and the gate line and a switching transistor are disposed, the switching transistor being controlled by a gate signal applied to a gate node through the gate line, and being electrically connected between the data line and the pixel electrode.

The touch sensing system may include a driving circuit configured to supply a first driving voltage to the data line when a gate signal of a turn-on level voltage is supplied to the gate line, and to supply a reference voltage to the data line when a gate signal of a turn-off level voltage is supplied to the gate line, an optical sensor, opposite ends of which are respectively connected to a source node and a drain node of the switching transistor, is irradiated with light; and a light irradiation device configured to irradiate the optical sensor with light.

According to the aspects, it is possible to provide a touch display device, a touch sensing system, and a touch sensing method that are capable of accurately sensing a touch position and/or a fingerprint in an optical manner.

According to the aspects, it is possible to provide a touch display device, a touch sensing system, and a touch sensing method that are capable of accurately sensing a touch position and/or a fingerprint without being affected by parasitic capacitance.

According to the aspects, it is possible to provide a touch display device, a touch sensing system, and a touch sensing method that are capable of efficiently performing the driving of sensing a touch position and/or a fingerprint.

According to the aspects, it is possible to provide a touch display device, a touch sensing system, and a touch sensing method that enable low-voltage driving for sensing a touch position and/or a fingerprint.

According to the aspects, it is possible to provide a touch display device, a touch sensing system, and a touch sensing method that are capable of raising a touch sensing frequency for sensing a touch position and/or a fingerprint.

According to the aspects, it is possible to provide a touch display device, a touch sensing system, and a touch sensing method that are capable of accurately sensing a touch position and/or a fingerprint without separately providing a touch sensor having a large size.

According to the aspects, it is possible to provide a touch display device, a touch sensing system, and a touch sensing method that are capable of performing a switching function for driving a display and a sensor function for sensing a touch position and/or a fingerprint using a single structure.

BRIEF DESCRIPTION OF THE DRAWINGS

The above features and advantages of the present disclosure will be more apparent from the following detailed description taken in conjunction with the accompanying drawings, in which:

FIG. 4 is a diagram illustrating a touch sensing structure of the touch display device according to the present disclosure;

DETAILED DESCRIPTION

Figure 1:
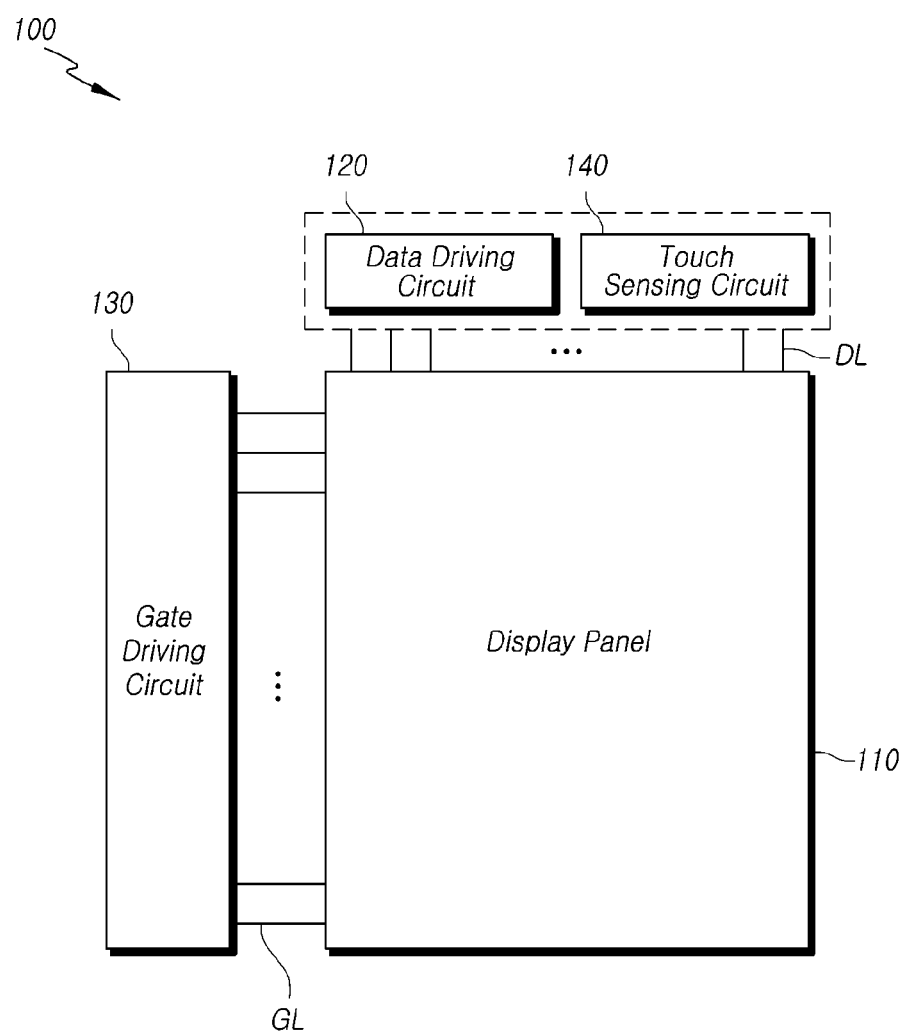
FIG. 1 is a simplified system configuration diagram of a touch display device according to the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

System Configuration and Kind of Touch Sensing

Figure 2:
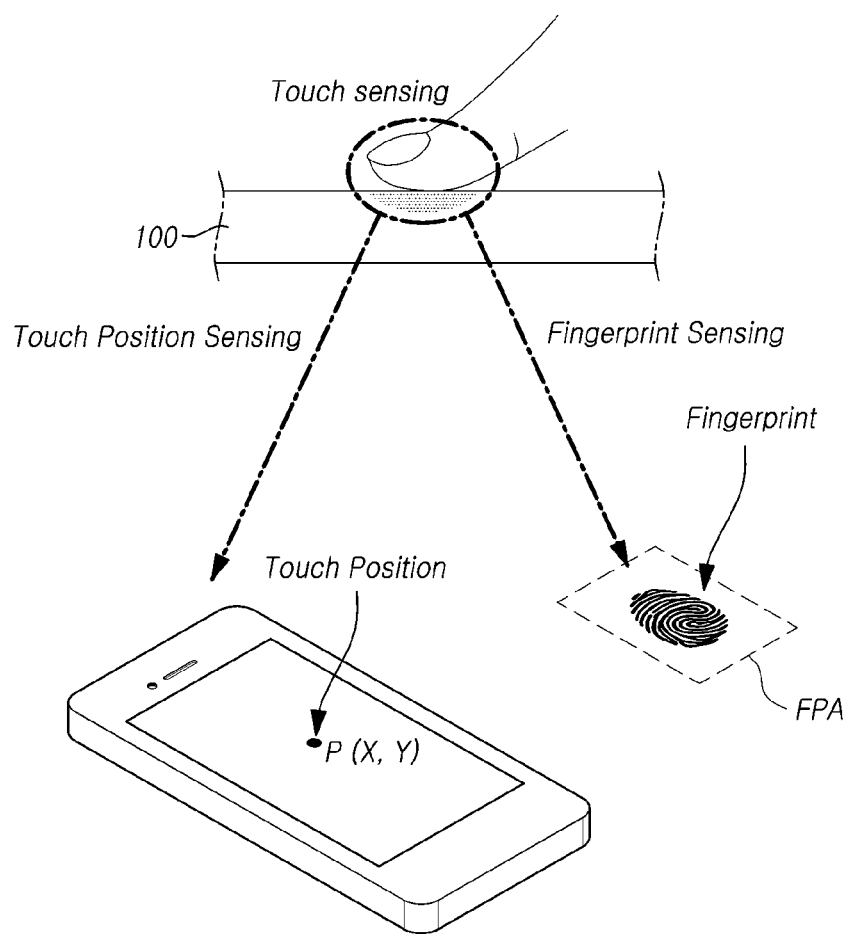
FIG. 2 is a diagram illustrating two kinds of touch sensing of the touch display device according to the present disclosure.

FIG. 1 is a simplified system configuration diagram of a touch display device 100 according to the present disclosure, and FIG. 2 is a diagram illustrating two kinds of touch sensing of the touch display device 100 according to the present disclosure.

Referring to FIG. 1, the touch display device 100 according to the present disclosure may provide an image display function and a touch input function.

The touch display device 100 according to the present disclosure may include a display panel 110, a data driving circuit 120, a gate driving circuit 130, a controller, and the like in order to provide an image display function.

A plurality of data lines DL and a plurality of gate lines GL are arranged in the display panel 110.

In addition, a plurality of pixels, which are defined by the plurality of data lines DL and the plurality of gate lines GL, are also arranged in the display panel 110.

In each pixel region, a pixel electrode to which a data voltage corresponding to an image signal of the pixel is applied, and a switching transistor configured to control the application of a data voltage to the pixel electrode may be disposed.

The data driving circuit 120 is a circuit that drives the plurality of data lines DL for image display, and may output a data voltage corresponding to the image signal through the plurality of data lines DL.

The gate driving circuit 130 sequentially drives the plurality of gate lines GL for image display, and may sequentially supply gate signals (scan signals) to a plurality of gate lines GL for image display.

The controller is configured to control the data driving circuit 120 and the gate driving circuit 130 and provides various control signals (e.g., a data driving control signal and a gate driving control signal) to the data driving circuit 120 and the gate driving circuit 130.

The controller starts scanning according to a timing implemented in each frame, converts input image data, which is input from the outside, to be suitable for the data signal format used in the data driving circuit 120, outputs the converted image data, and controls data driving at a suitable time for the scanning.

The controller may be a timing controller that is used in a typical display technique, or a control device that includes the timing controller configured to additionally perform other control functions.

FIG. 1 shows that the data driving circuit 120 is positioned at one side only (e.g., the upper side or the lower side) of the display panel 110, but data driving circuits may be positioned at both sides (e.g., the upper side and the lower side) of the display panel 110 depending on a driving method, a panel design method, or the like.

The data driving circuit 120 may be implemented by including one or more source driver integrated circuits (SDICs).

Each SDIC may be connected to a bonding pad of the display panel 110 by a tape automated bonding (TAB) method or a chip-on-glass (COG) method or may be disposed directly on the display panel 110. In some cases, the SDIC may be integrated on the display panel 110. In addition, each SDIC may be implemented by a chip-on-film (COF) method in which the SDIC is mounted on a film connected to the display panel 110.

Each SDIC may include a shift register, a latch circuit, a digital-to-analog converter (DAC), an output buffer, and the like.

Each SDIC may further include an Analog-to-Digital Converter (ADC) in some instances.

FIG. 1 shows that the gate driving circuit 130 is positioned at one side only (e.g., the left side or the right side) of the display panel 110. However, gate driving circuits may be positioned at both sides (e.g., the left and right sides) of the display panel 110 depending on a driving method, a panel design method, or the like.

The gate driving circuit 130 may be implemented by including one or more gate driver integrated circuits (GDICs).

Each GDIC may be connected to a bonding pad of the display panel 110 by the TAB method or the COG method, or may be disposed directly on the display panel 110 by being implemented in a gate-in-panel (GIP) type. In some instances, the GDIC may be integrated and disposed on the display panel 110. In addition, each GDIC may be implemented in the COF method, in which the GDIC is mounted on a film connected to the display panel 110.

Each GDIC may include a shift register, a level shifter, and the like.

Each pixel disposed in the display panel 110 may include circuit elements, such as a transistor.

The types and the number of the circuit elements constituting each pixel may be variously determined according to provided functions, a design method, and the like.

Meanwhile, the touch display device 100 according to the present disclosure may provide a touch sensing function of sensing a touch of a user in order to provide a touch input function.

Here, a touch object, which is the touch means of the user, may be, for example, a finger, a pen, or the like. Hereinafter, for the convenience of description, descriptions will be made assuming that the touch object is a finger.

In the present disclosure, the touch sensing function includes a touch position sensing function for sensing the presence or absence of a user's touch and/or a touch position (i.e., touch coordinates P (X, Y)), and a fingerprint sensing function (or a fingerprint recognition function) that senses a user's fingerprint.

In the touch display device 100 according to the present disclosure, the touch position sensor may be disposed by being embedded in the display panel 110 to sense a touch position.

That is, in the touch display device 100 according to the present disclosure, the touch screen panel may be a type embedded in the display panel 110 (e.g., an in-cell type, an on-cell type, or the like).

A plurality of touch position sensors may be distributed in the entire region of the display panel 110.

In the touch display device 100 according to the present disclosure, a fingerprint sensor may also be disposed by being embedded in the display panel 110 to sense a fingerprint.

The fingerprint sensor may be some or all of a plurality of touch position sensors embedded in the display panel 110.

Alternatively, the fingerprint sensor may be separate from the plurality of touch position sensors embedded in the display panel 110.

A plurality of fingerprint sensors may be distributed in a partial region of the display panel 110.

As described above, the fingerprint sensor may be all or some of the plurality of touch position sensors or may be separate from the plurality of touch position sensors. However, the fingerprint sensor and the touch position sensor may have the same structure and operate in the same manner.

That is, the touch display device 100 according to the present disclosure detects the signal by driving the fingerprint sensor and the touch position sensor in the same manner.

However, based on the detected signal, the processing (algorithm) for determining a touch position may be different from the processing (algorithm) for determining fingerprint information.

Referring to FIG. 1, in order to provide a touch sensing function, the touch display device 100 according to the present disclosure may include a touch sensing circuit 140 that detects an electrical signal by driving a touch sensor (e.g., a touch position sensor or a fingerprint sensor), thereby acquiring touch information.

The touch information acquired by the touch sensing circuit 140 may be, for example, fingerprint information or touch position information.

Here, the fingerprint information may be information including a shape and pattern of ridges which are portions protruding in the fingerprint of the finger, and valleys which are portions depressed between the ridges.

Such fingerprint information may be biometric information unique to each user.

The touch position information may be information about a position where the user touches the screen, or may include information about whether or not a touch is present or absent.

Meanwhile, the term, "touch of the user" may mean that the user touches the screen, or may mean a case where the user does not touch the screen but approaches the screen within a predetermined distance.

As described above, the touch display device 100 may acquire touch information including touch position information or fingerprint information and may utilize the acquired touch information in order to perform various application functions.

Figure 3A:
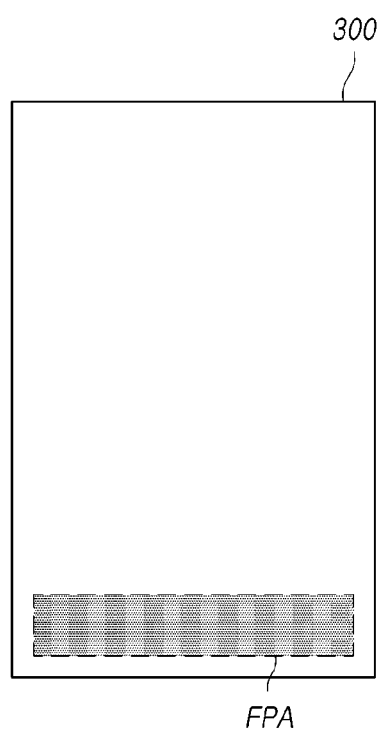
FIGS. 3A, 3B, and 3C are exemplary views of a fingerprint-sensing region of the touch display device according to the present disclosure.
Figure 3B:
Figure 3C:
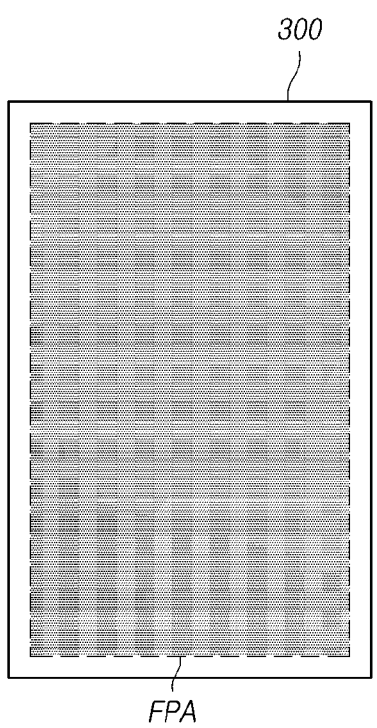

FIGS. 3A, 3B, and 3C are exemplary views each illustrating a fingerprint sensing region FPA of the touch display device 100 according to the aspects.

Referring to FIG. 3A, the fingerprint sensing region FPA may be a partial region inside the image display region 300.

Referring to FIG. 3B, the fingerprint sensing region FPA may be a region outside the image display region 300.

Referring to FIG. 3C, the fingerprint sensing region FPA may correspond to the entire region of the image display region 300.

The fingerprint sensing region FPA may be the front face of the touch display device 100 or a rear face. In some cases, the fingerprint sensing region FPA may be a side face.

In such a fingerprint sensing region FPA, a fingerprint sensor may be present.

The fingerprint sensor may be disposed on the display panel 110. In some cases, the fingerprint sensor may be disposed on a panel (sensor panel) other than the display panel 110.

When the fingerprint sensor is disposed on the display panel 110, the fingerprint sensing region FPA may be present in the entire region of the display panel 110, or only in a portion of the display panel 110.

Meanwhile, the touch display device 100 according to the present disclosure may perform touch sensing (e.g., touch position sensing or fingerprint sensing) using a touch sensing structure based on a pixel structure.

Here, the pixel structure may be an actual pixel structure in which pixels are capable of actually displaying an image, or a similar pixel structure that is similar to the actual pixel structure, but does not actually display an image.

In the following, a touch sensing structure based on a pixel structure and a touch sensing principle will be described.

Touch Sensing Structure

Figure 5:
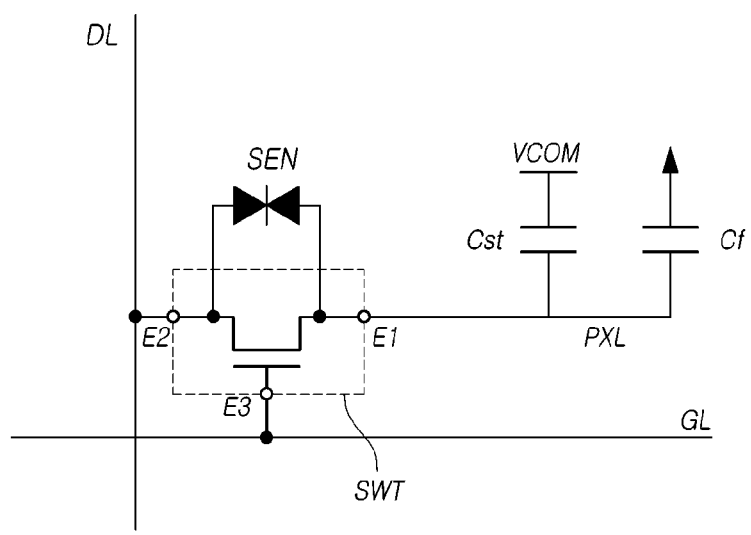
FIG. 5 is an equivalent circuit diagram of the touch sensing structure of the touch display device according to the present disclosure.

FIG. 4 is a diagram illustrating a touch sensing structure of the touch display device 100 according to the present disclosure, and FIG. 5 is an equivalent circuit diagram of the touch sensing structure of the touch display device 100 according to the present disclosure.

Referring to FIG. 4, the display panel 110 of the touch display device 100 according to the present disclosure has a touch sensing structure based on a pixel structure.

A plurality of data lines DL and a plurality of gate lines GL are arranged on the display panel 110 of the touch display device 100 according to present disclosure, and a plurality of pixels defined by the plurality of data lines DL and the plurality of gate lines GL may also be arranged.

A pixel electrode PXL, to which a data voltage (that is, a pixel voltage), which is an image signal corresponding to the pixel, is applied, may be disposed in a region corresponding to each pixel, that is, each pixel region PA.

In addition, a switching transistor SWT, which is electrically connected between a data line DL and a pixel electrode PXL and is subjected to on/off control by a gate signal applied to a gate node through the gate line GL, may be disposed in each pixel region PA.

The switching transistor SWT transfers data voltage from the data line DL to the pixel electrode PXL in a turn-on state.

The switching transistor SWT includes a first node E1 electrically connected to the pixel electrode PXL, a second node E2 electrically connected to the data line DL, a third node E3 electrically connected to the gate line GL, and a semiconductor layer the opposite ends of which are contacted with the first node E1 and the second node E2, respectively.

The switching transistor SWT may be subjected to on/off control according to the gate signal (also referred to as a "scan signal") of the third node E3 from the gate line GL.

In the switching transistor SWT, the first node E1 may be a drain node or a source node. The second node E2 may be a source node or a drain node. The third node E3 may be a gate node.

Hereinafter, for convenience of description, it will be described that the first node E1 is a drain node, the second node E2 is a source node, and the third node E3 is a gate node.

The switching transistor SWT may be an n-type transistor or a p-type transistor.

Meanwhile, referring to FIG. 4, an optical sensor SEN, the opposite ends of which are respectively connected to a first node E1 and a second node E2 of the switching transistor SWT, may be disposed in each pixel region PA.

That is, of the opposite ends of the optical sensor SEN, the first end may be in direct contact with the first node E1 of the switching transistor SWT or may be in indirect contact with the first node E1 of the switching transistor SWT through another pattern. Of the opposite ends of the optical sensor SEN, the second end may be in direct contact with the second node E2 of the switching transistor SWT or may be in indirect contact with the second node E2 of the switching transistor SWT through another pattern. For example, the optical sensor SEN may be a photosensitive material layer (e.g., undoped amorphous silicon or $n^+$- or $p^+$-doped amorphous silicon), the opposite ends of which are in contact with the first node E1 (e.g., a drain node or a source node) and the second node E2 (e.g., a source node or a drain node) of the switching transistor SWT, respectively.

Pixel regions PA, in each of which the optical sensor SEN is disposed, may be distributed over the entire region of the display panel 110.

When the pixel regions PA, in each of which the optical sensor SEN is disposed, are disposed over the entire region of the display panel 110, the presence or absence of a touch and/or the touch position may be sensed in the entire region of the display panel 110, or a fingerprint may be sensed in the entire region of the display panel 110.

Alternatively, pixel regions PA, in each of which the optical sensor SEN is disposed, may be distributed over a partial region of the display panel 110.

When the pixel regions PA, in each of which the optical sensor SEN is disposed, are disposed only in the partial region of the display panel 110, the presence or absence of a touch and/or the touch position may be sensed in the partial region of the display panel 110, or a fingerprint may be sensed in the partial region of the display panel 110.

As described above, in the present disclosure, a touch sensing structure may include a pixel electrode PXL, a switching transistor SWT, an optical sensor SEN, and the like, which are arranged in each pixel region PA.

In addition, in the present disclosure, it may be considered that the touch sensing structure may include a data line DL and a gate line GL.

On the other hand, a common electrode CE, to which common voltage VCOM is applied, may be disposed on the display panel 110.

The common electrode CE and each pixel electrode PXL may form a storage capacitor Cst that serves to maintain a voltage required for image display for a period time corresponding to one frame.

The capacitance of the storage capacitor Cst in each pixel is determined by the common voltage VCOM applied to the common electrode PXL and the pixel voltage applied to each pixel electrode PXL.

Meanwhile, when the user touches the display panel 110, a finger capacitor Cf may be formed between the finger and the pixel electrode PXL.

The capacitance of the finger capacitor Cf may vary depending on the position of the corresponding pixel with respect to the touch.

Accordingly, the touch display device 100 may detect the presence or absence of a touch and/or the touch position by detecting a difference in capacitance.

Further, the capacitance of the finger capacitor Cf may vary depending on the ridges, which are portions protruding in the fingerprint of the finger, and valleys, each of which is a depressed portion between adjacent ridges.

Accordingly, the touch display apparatus 100 may detect the fingerprint information including the pattern and shape of the ridges and valleys of the fingerprint by detecting a difference in capacitance.

On the other hand, the above-described optical sensor SEN has a property of reacting to light, that is, photosensitivity. Here, the reaction to light (optical reaction) means that an electrical characteristic is changed.

In the touch display device 100 according to the present disclosure, the optical sensor SEN is photosensitive to light in a specific wavelength band.

The optical sensor SEN operates as a nonconductor in the state before the optical sensor SEN is irradiated with light, and acts as a conductor when the optical sensor SEN is irradiated with light, so that the electrical characteristic is changed and as a result, the opposite ends thereof are electrically connected to each other. Here, the optical sensor SEN may also be referred to as a photosensor.

The type of irradiation light for the optical sensor SEN may be determined depending on the material of the optical sensor SEN.

For example, the irradiation light for the optical sensor SEN may be, for example, visible light or infrared light.

When the photo sensor SEN is a material that reacts visible light well (e.g., amorphous silicon), visible light may be used as the irradiation light.

When the photo sensor SEN is a material that reacts infrared rays well (e.g., undoped amorphous silicon, or $n^+$- or $p^+$-doped amorphous silicon), infrared light may be used as the irradiation light.

As described above, by selecting the effective irradiation light in consideration of the degree of optical reaction depending on the material of the optical sensor SEN, the touch sensing performance obtained by utilizing the optical sensor SEN may be improved.

Meanwhile, when a touch is located around a pixel region PA in which an optical sensor SEN is disposed, the conductivity of the optical sensor SEN irradiated with the light may be changed.

The touch display device 100 according to the present disclosure may acquire touch information on the presence or absence of a touch and/or the touch position based on the difference in conductivity of the optical sensor SEN depending on the presence or absence of a touch (i.e., the difference in magnitude of leakage current).

When a touch is located around a pixel region PA in which an optical sensor SEN is disposed, the conductivity of the optical sensor SEN irradiated with the light may be changed according to the ridges and valleys of the fingerprint.

The touch display device 100 according to the present disclosure may acquire touch information corresponding to the fingerprint information based on the difference in the conductivity of the optical sensor SEN depending on the ridges and valleys of a fingerprint (i.e., the difference in magnitude of leakage current).

Since the above-described touch sensing structure is based on a pixel structure, a separate touch sensor (i.e., a touch position sensor or a fingerprint sensor) for sensing a touch position and/or a fingerprint may not be formed on the display panel 110.

Therefore, it is possible to simplify the fabrication of the display panel 110 having a touch sensing structure, and to reduce the thickness of the display panel 110 having the touch sensing structure.

In addition, since both the touch position and the fingerprint can be sensed using the same touch sensing structure, the above advantages may be further maximized.

Meanwhile, according to the above-described touch sensing structure, since the opposite ends of the optical sensor SEN are respectively in contact with the first node E1 and the second node E2 of the switching transistor SWT, the switching transistor SWT and the optical sensor (SEN) may be considered as a single device in combination.

From this point of view, it is not necessary to separately make a switching element for driving a display and a touch sensor element for touch sensing.

Hereinafter, how both the display driving and the touch sensing are performed with one element will be described with reference to FIGS. 6 and 7.

Figure 6:
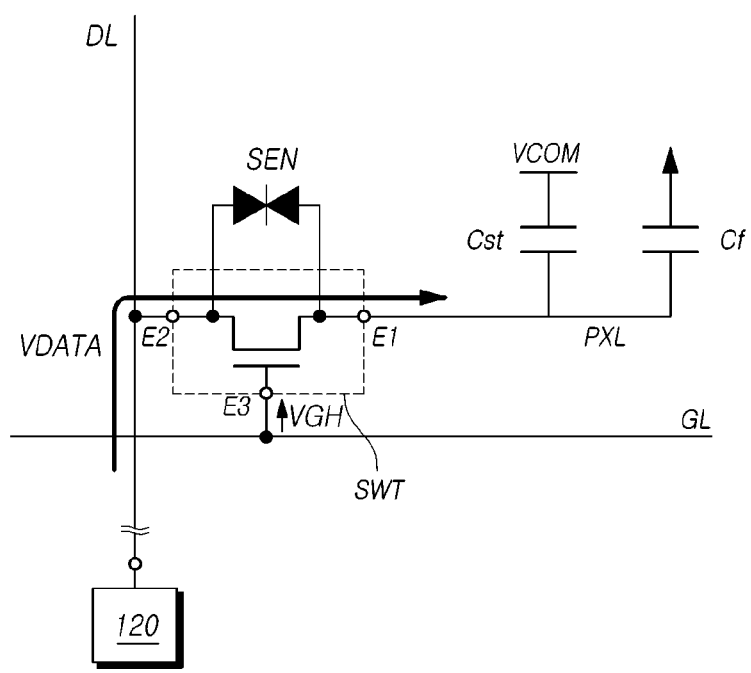
FIG. 6 is a diagram illustrating display driving of the touch display device according to the present disclosure.
Figure 7:
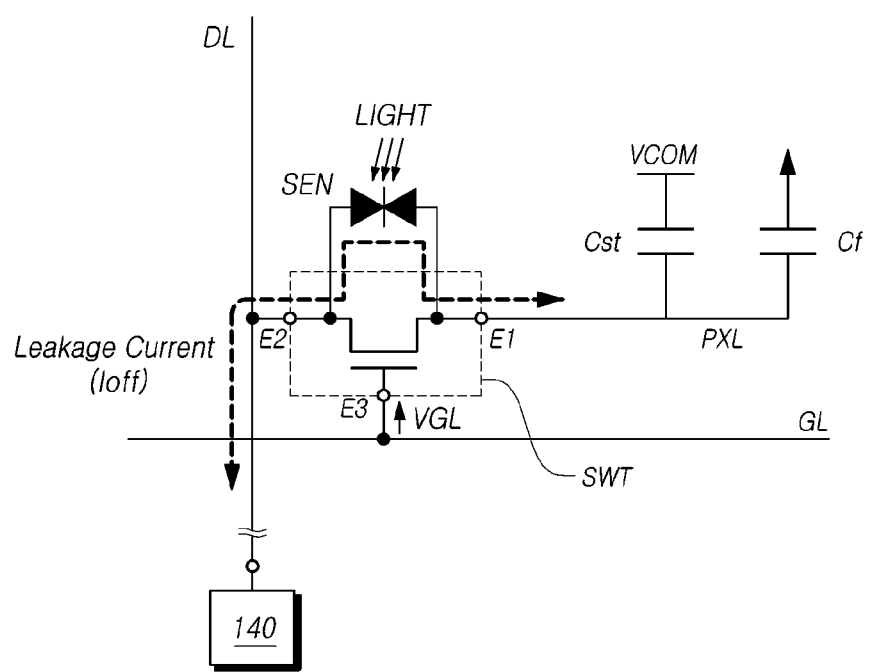
FIG. 7 is a diagram illustrating touch sensing of the touch display device according to the present disclosure.

FIG. 6 illustrates the display driving of the touch display device 100 according to the present disclosure, and FIG. 7 illustrates the touch sensing of the touch display device 100 according to the present disclosure.

The touch display device 100 according to the present disclosure has a display mode in which display driving for displaying an image progresses and a touch sensing mode in which touch sensing progresses.

Referring to FIGS. 6 and 7, the data driving circuit 120 drives the data line DL during the display mode period, and the touch sensing circuit 140 performs driving required for touch sensing and signal detection processing during the touch sensing mode period.

The operation period of the touch display device 100 according to the present disclosure may include a display mode period for image display and a touch sensing mode period for touch sensing (touch position sensing or fingerprint sensing).

The operation period of the touch display device 100 may be divided into a display mode period and a touch sensing mode period, and the display mode period and the touch sensing mode period may progress in an alternating manner.

Referring to FIG. 6, a timing at which a gate signal of a turn-on level voltage (e.g., VGH) capable of turning on the switching transistor SWT is supplied to the gate line GL is included in the display mode period.

At the timing when the gate signal of the turn-on level voltage (e.g., VGH) is supplied to the gate line GL, the switching transistor SWT is turned on and the data voltage VDATA output to the data line DL from the data driving circuit 120 is applied to the pixel electrode PXL through the turned-on switching transistor SWT.

Referring to FIG. 7, a timing at which a gate signal of a turn-off level voltage (e.g., VGL) capable of turning off the switching transistor SWT is supplied to the gate line GL may be included in the touch sensing mode period.

Further referring to the touch sensing operation procedure, the touch sensing circuit 140 applies driving voltage required for touch sensing to the pixel electrode PXL through the switching transistor SWT turned on, in the state in which the switching transistor SWT is turned on as a gate signal of a turn-on level voltage (e.g., VGH) is applied to the gate line GL before the switching transistor SWT is turned off during the touch sensing mode period.

Thereafter, the gate driving circuit 130 turns off the switching transistor SWT by supplying a gate signal of a turn-off level voltage (e.g., VGL) capable of turning off the switching transistor SWT to the gate line GL.

At this time, the optical sensor SEN having photosensitivity is irradiated with light.

At this time, a reference voltage may be supplied to the data line DL.

Accordingly, the optical sensor SEN reacts to the irradiated light so that the electrical characteristic of the optical sensor SEN is changed.

Thus, a driving voltage is applied to the pixel electrode PXL so that leakage current Ioff is generated, thereby causing the charge stored in the capacitors Cf and Cst connected to the pixel electrode PXL, to flow from the first electrode E1 to the second electrode E2 through the optical sensor SEN.

The magnitude of the leakage current Ioff may vary depending on the positional relationship between the pixel electrode PXL and the finger.

That is, the difference in the leakage current Ioff may occur depending on the presence or absence of the touch. For example, when there is touch, the total reflection phenomenon of the light is collapsed at the position where the optical sensor SEN is present, and as a result, the characteristic (e.g., the amount of light) of the light irradiated to the optical sensor SEN changes, which may cause the magnitude of the leakage current through the optical sensor SEN to vary.

Accordingly, the touch sensing circuit 140 may detect the presence or absence of a touch and/or the touch position based on the difference in the magnitude of the leakage current Ioff.

In addition, the magnitude of the leakage current may vary depending on whether there is a fingerprint ridge or a fingerprint valley in a region where the pixel electrode PXL is located.

That is, the difference in the leakage current may occur depending on the ridges and valleys of the fingerprint. For example, the total reflection phenomenon of light appears differently in the case in which there is a fingerprint ridge and in the case in which there is a fingerprint valley, and the characteristic of the light (e.g., the amount of light), with which the optical sensor SEN is irradiated, may vary in magnitude, and as a result the magnitude of the leakage current Ioff through the optical sensor SEN may vary.

Therefore, the touch sensing circuit 140 is able to detect the fingerprint information including the pattern and shape of the ridges and valleys of a fingerprint based on a difference in magnitude of the leakage current Ioff.

As described above, both the display driving and the touch sensing may be performed through one device including a switching transistor SWT and an optical sensor SEN.

In other words, the touch sensing circuit 140 may detect touch information (touch position information or fingerprint information) based on the difference in the leakage current Ioff flowing to the data line DL through the optical sensor SEN for each pixel region.

Therefore, the data line DL used for the display driving may be utilized as a path for detecting information required for touch sensing. Accordingly, there is an advantage that a separate signal line that electrically connects the optical sensor SEN corresponding to the touch sensor and the touch sensing circuit 140 is not required.

The above-described optical sensor SEN may be referred to as a kind of a switch that conducts current (leakage current) under a specific condition (light irradiation).

As described above, when the optical sensor SEN is irradiated with light during the supply of a gate signal of a turn-off level voltage to the gate line GL, current leakage occurs through the optical sensor SEN, and as a result, the current Ioff flows in the data line DL.

When the optical sensor SEN is not irradiated with light during the supply of the gate signal of the turn-off level voltage to the gate line GL, current leakage does not occur or negligibly occurs through the optical sensor SEN, and as a result, the current Ioff does not flow through the data line DL or flows very little not to exceed a predetermined level.

Here, the predetermined level means a very small current that may be used for touch sensing and may be a preset value.

Herein, when it is described that current leakage is absent, it may include the case where the leakage current through the optical sensor SEN is completely absent or the case where the amount of leakage current through the optical sensor SEN is less than a predetermined level even if leakage current through the optical sensor SEN is present.

As described above, by using the current leakage characteristic of the optical sensor SEN according to the presence or absence of light irradiation, it is possible to sense presence or absence of a touch and/or the touch position, or to sense a fingerprint.

Touch Sensing Circuit

Figure 8:
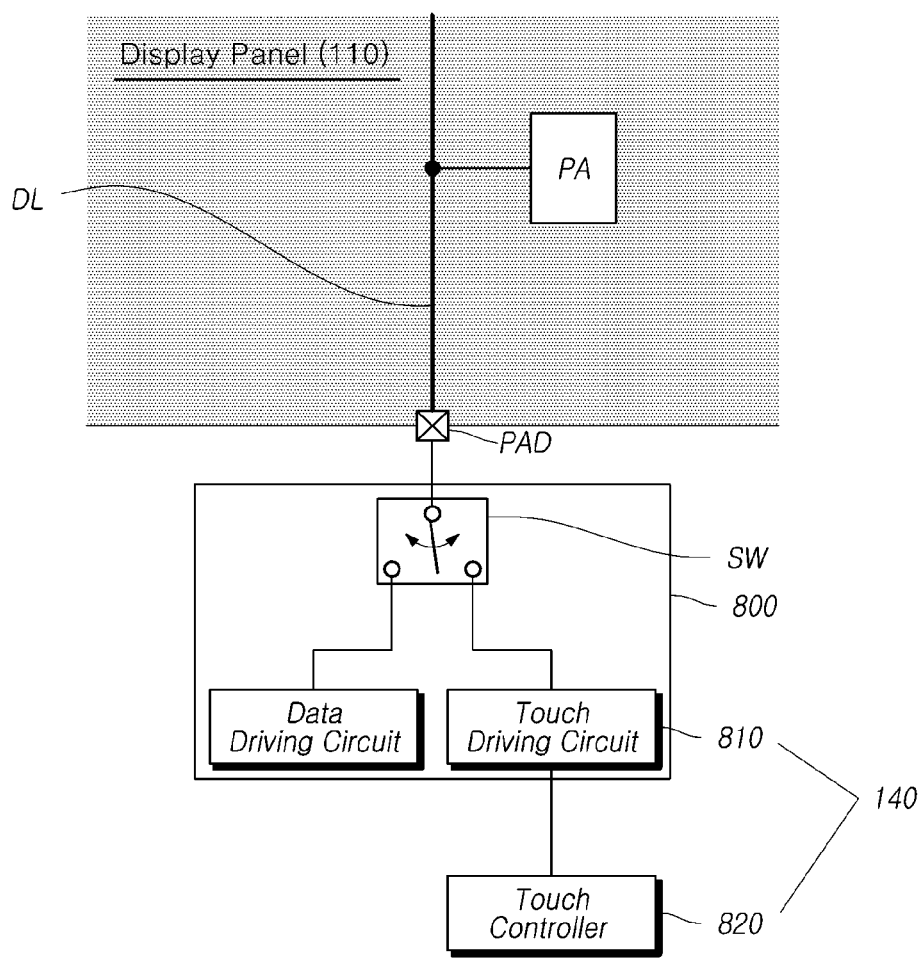
FIG. 8 is a diagram illustrating driving circuits of the touch display device according to the present disclosure.

FIG. 8 is a diagram illustrating driving circuits of the touch display device 100 according to the present disclosure.

Referring to FIG. 8, in the touch display device 100 according to the present disclosure, the touch sensing circuit 140 may include a touch driving circuit 810 that detects current Ioff flowing in the data line DL during a touch sensing mode period or charge or a signal corresponding to the current Ioff, a touch controller 820 that acquires touch information based on the detection result of the touch driving circuit 810 using a touch algorithm, and the like.

As described above, by configuring the touch sensing circuit 140 to be divided into the touch driving circuit 810 that performs the driving and detecting processing and the touch controller 820 that performs the touch information acquisition processing using the touch algorithm, the driving and detection processing and the touch information acquisition processing may be performed in parallel, thereby reducing the processing load and improving the touch sensing performance and efficiency.

Meanwhile, one or more touch driving circuits 810 may be implemented as one driving integrated circuit 800 together with the data driving circuit 120 that supplies an image signal to the data line DL during the display mode period.

As described above, since the touch driving circuit 810 and the data driving circuit 120, which are electrically connected to the data line DL according to an operation mode, are implemented as one driving integrated circuit 800, display driving and touch driving may be efficiently performed by efficiently using the data line DL.

As described above, since the two driving circuits including the touch driving circuit 810 and the data driving circuit 120 need to be electrically connected to the data line DL, the touch display device 100 according to the present disclosure may further include a switch SW configured to electrically connect the touch driving circuit 810 to the data line DL in the display mode period and to electrically connect the touch driving circuit 810 to the data line DL in the touch sensing mode period.

Such a switch SW may be included in the drive integrated circuit 800 in which the touch driving circuit 810 and the data driving circuit 120 are integrated.

The switch SW may be electrically connected to a pad that is electrically connected to the data line DL of the display panel 110.

The switch SW may include an X1 point connected to the data driving circuit 120, an X2 point connected to the touch driving circuit 810, and a Y point connected to the pad of the display panel 110, and may connect one of the X1 and X2 points to the Y point depending on the on/off operation.

The switch SW may further include an X3 point, which is connected neither to the data driving circuit 120 nor to the touch driving circuit 810. When the switch SW connects the point X3 and the point Y, no voltage signal, such as a data voltage or a driving voltage, is supplied to the corresponding data line DL. That is, the data line DL may be in a floating state.

In the present disclosure, the driving voltage VDRV may be supplied from the touch driving circuit 810 or from another voltage supplying device.

Figure 9:
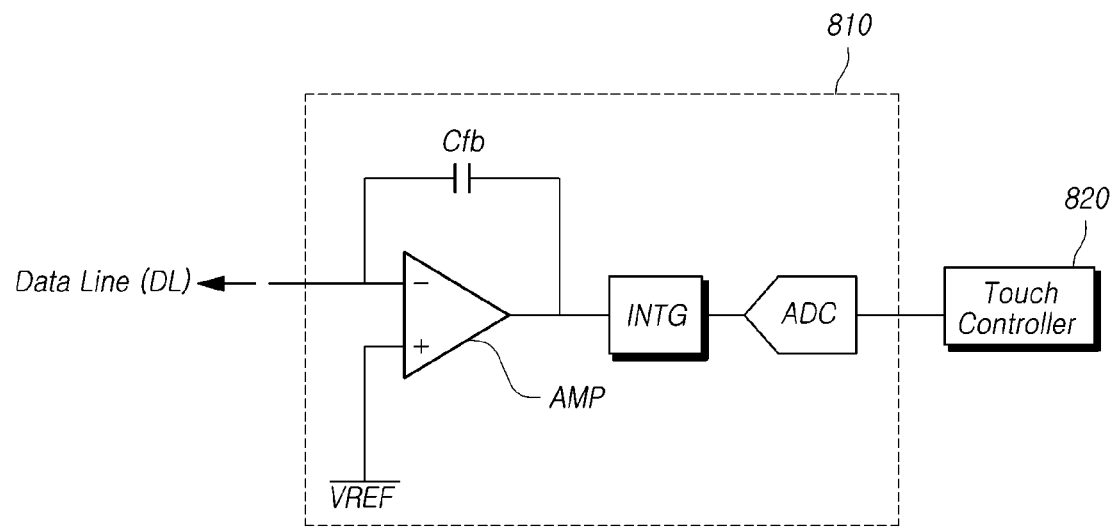
FIG. 9 is a diagram illustrating a touch driving circuit of the touch display device according to the present disclosure.

FIG. 9 is a diagram illustrating the touch driving circuit 810 of the touch display device 100 according to the present disclosure.

Referring to FIG. 9, the touch driving circuit 810 may include an amplifier AMP, an integrator INTG, an analog-to-digital converter ADC, and the like.

The amplifier AMP may output the input reference voltage VREF to the corresponding data line DL of the display panel 110.

Here, the reference voltage VREF may be a DC voltage or an AC voltage.

The amplifier AMP may receive a driving voltage (VDRV shown in FIGS. 12, 13, 15 and 16) which is a voltage different from the reference voltage VREF, and outputs the driving voltage to the corresponding data line DL of the display panel 110.

Here, the driving voltage may be a voltage signal having a positive or negative voltage pulse in a predetermined period, or may be a voltage signal having a positive voltage pulse and a negative voltage pulse in different periods.

This driving voltage may be output from the data driving circuit 120 or another voltage supplying circuit without being output from the touch driving circuit 810.

The touch driving circuit 810 may include one or more multiplexers between the amplifier AMP and the display panel 110.

When current flows through the data line DL, the charge corresponding to this current may be charged in a feedback capacitor Cfb of the amplifier AMP.

Accordingly, a signal output from the output terminal of the amplifier AMP is input to the integrator INTG.

The integrator INTG integrates the input signal and outputs the integrated signal.

The analog-to-digital converter ADC converts an analog signal corresponding to the input integrated value into a digital sensing value, and outputs the digital sensing value to the touch controller 820.

The touch driving circuit 810 may further include a sample-and-hold circuit and one or more multiplexers between the integrator INTG and the analog-to-digital converter ADC.

Light Irradiation Device

Figure 10:
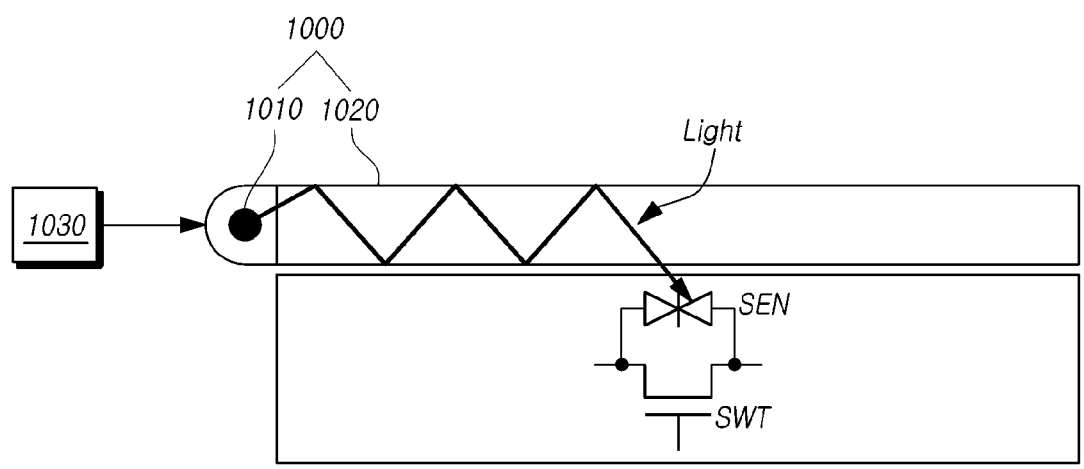
FIG. 10 is a diagram illustrating a light irradiation device of the touch display device according to the present disclosure.

FIG. 10 is a diagram illustrating the light irradiation device 1000 of the touch display device 100 according to the present disclosure.

Referring to FIG. 10, the touch display device 100 according to the present disclosure may include a light irradiation device 1000 that irradiates light to the optical sensor SEN at a light irradiation timing.

The light irradiation device 1000 may include a light output device 1010 that outputs light, a light guide device 1020 that guides the light output from the light output device 1010 to a pixel region PA having an optical sensor SEN, and the like.

The light output from the light output device 1010 is transmitted to the pixel region PA having the optical sensor SEN while being totally reflected by the light guide device 1020.

Here, the light guide device 1020 may be positioned above the layer on which a switching transistor SWT is formed.

Meanwhile, referring to FIG. 10, the touch display device 100 according to the present disclosure may further include a light output timing controller 1030 that controls the timing (light irradiation timing) at which light is output from the light output device 1010.

The light output timing controller 1030 may be a controller that controls the data driving circuit 120 and the gate driving circuit 130.

With the above-described light irradiation device 1000, the optical sensor SEN may be irradiated with light at the light irradiation timing required for touch sensing.

Hereinafter, an optical touch sensing method using the optical sensor SEN briefly described above will be described in more detail.

In an optical touch sensing method according to present disclosure, touch information is acquired by performing driving and signal detection processing using a touch sensing structure during a touch sensing mode period.

This touch sensing mode period basically includes a first period (S10 and S40 shown in FIG. 11 to 13 or P10 shown in FIGS. 14 to 16) in which a gate signal of a turn-on level voltage is supplied to the gate line GL and a driving voltage VDRV is supplied to a data line DL, and a second period (S20 and S50 shown in FIGS. 11 to 13, or P20 and P40 shown in FIGS. 14 to 16) in which a gate signal of a turn-off level voltage is supplied to the gate line GL, a reference voltage VREF is supplied to the data line DL, and the optical sensor SEN is irradiated with light.

Leakage current Ioff flows in the data line DL in the second period (S20 and S50 shown in FIG. 11 to 13 or P20 and P40 shown in FIGS. 14 to 16) through the driving and signal detection processing described above.

The touch sensing circuit 140 may be electrically connected to the data line DL such that touch information may be acquired in response to the current (i.e., the leakage current Ioff) flowing in the data line DL.

As described above, by utilizing the pixel structure as a touch sensing structure, and causing the leakage current Ioff to be generated through the optical sensor SEN and to flow in the data line DL, it is possible to sense presence or absence of a touch and/or the touch position, or to sense the fingerprint based on the leakage current Ioff.

In the following, a first touch sensing method using a DC (Direct Current) reference voltage VREF and a second touch sensing method using an Alternating Current (AC) reference voltage VREF will be described as optical touch sensing methods.

The first touch sensing method according to the present disclosure is a touch sensing method in which touch sensing is performed in an optical manner using a DC reference voltage VREF having no voltage level fluctuation.

According to the first touch sensing method, in the touch sensing mode period, the reference voltage VREF supplied to the data line DL at the light irradiation timing or before or after the light irradiation timing may be a DC voltage.

As described above, when touch sensing is performed using the DC reference voltage VREF, the generation and supply of the reference voltage VREF are facilitated.

In addition, in the first touch sensing method, a driving voltage VDRV supplied to the data line DL in the timing period for pixel charging (i.e., charging of the capacitor Cst between the pixel electrode PXL and the common electrode CE) may alternate between a first driving voltage VDRV1 and a second driving voltage VDRV2 that have opposite polarities. Accordingly, the pixel electrode PXL to which the driving voltage VDRV is applied may be driven in a polarity inversion manner.

As described above, when the first driving voltage VDRV1 and the second driving voltage VDRV2, which have opposite polarities, are alternately used as the driving voltage VDRV, deterioration of liquid crystal or the like may be prevented.

In addition, in the first touch sensing method, the pixel electrode PXL may alternate between a state in which the first driving voltage VDRV1 is applied thereto, a state in which the reference voltage VREF is applied thereto, a state in which the second driving voltage VDRV2 is applied thereto, and the state in which the reference voltage VREF is applied thereto.

Thus, the voltage of the pixel electrode PXL may vary by a required degree (a degree required for touch sensing). Through this, it is possible to sense the pixel charge (i.e., the charge charged in the capacitor Cst between the pixel electrode PXL and the common electrode CE).

According to the first touch sensing method disclosed above, the touch sensing frequency corresponding to ½ of the display driving frequency may be obtained. That is, one touch sensing operation may be implemented during two frame periods (image frame periods).

Accordingly, in the case of the first touch sensing method using the DC reference voltage VREF, there may be a drawback in that the touch sensing speed is somewhat slow, despite various advantages.

Meanwhile, the second touch sensing method according to the present disclosure is a touch sensing method in which touch sensing is performed in an optical manner using an AC reference voltage VREF, the level of which swings.

According to the second touch sensing method, in the touch sensing mode period, the reference voltage VREF supplied to the data line DL at the light irradiation timing or before or after the light irradiation timing may be an AC voltage.

In this second touch sensing method, the driving voltage VDRV supplied to the data line DL in the pixel charging period (S10 and S40 shown in FIG. 11 to 13 or P10 shown in FIGS. 14 to 16) may be supplied only once during the initial frame period.

In addition, unlike the first touch sensing method, the driving voltage VDRV does not need be supplied every touch sensing time (i.e., the driving voltage does not need to be supplied once every two frame periods). The current may be supplied only once.

Therefore, unlike the first touch sensing method, the driving voltage VDRV does not need to be supplied while changing the polarity.

As described above, according to the second touch sensing method, the number of times of supplying the driving voltage VDRV may be reduced.

Meanwhile, in the second touch sensing method, the reference voltage VREF may be an AC voltage that alternates between the first reference voltage VREF1 and the second reference voltage VREF2.

Accordingly, in the second touch sensing method, the driving voltage VDRV enables a voltage, which is lower than the driving voltage VDRV in the first touch sensing method, to be used.

For example, when the positive first driving voltage VDRV1 and the negative second driving voltage VDRV2 corresponding to the driving voltage VDRV in the first touch sensing method are +A [V] and −A [V] and the driving voltage VDRV in the second touch sensing method is B [V], B may be smaller than A.

Meanwhile, in the second touch sensing method, the pixel electrode PXL may alternate between a state in which the first reference voltage VREF1 is applied thereto and a state in which the second reference voltage VREF2 is applied thereto, starting from a state in which the driving voltage VDRV is applied thereto.

Therefore, according to the second touch sensing method, the voltage of the pixel electrode PXL may vary by a required degree (a degree required for the touch sensing) even though a low driving voltage VDRV is used.

According to the second touch sensing method disclosed above, the touch sensing frequency corresponding to the display driving frequency may be obtained.

For example, according to the second touch sensing method, the touch sensing frequency may be the same as the display driving frequency.

That is, one touch sensing operation may be implemented in each frame period (image frame period).

Accordingly, in the case of the second touch sensing method using the AC reference voltage VREF, there is an advantage in that the touch sensing speed is high.

Hereinafter, the first and second touch sensing methods briefly described above will be described in more detail with reference to a timing diagram.

First Touch Sensing Method

Figure 11:
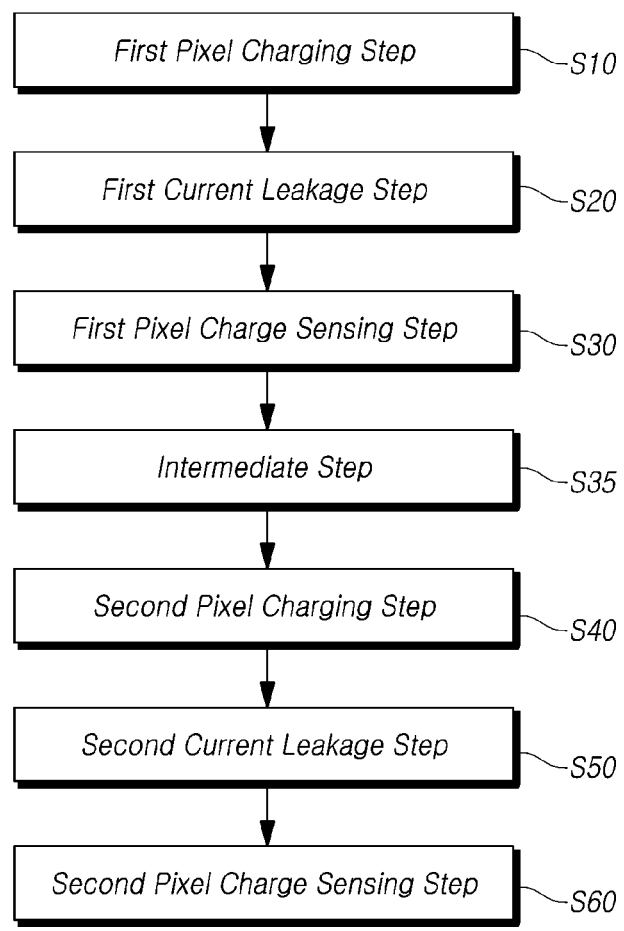
FIG. 11 is a flowchart of a first touch sensing method of the touch display device according to the aspects.
Figure 12:
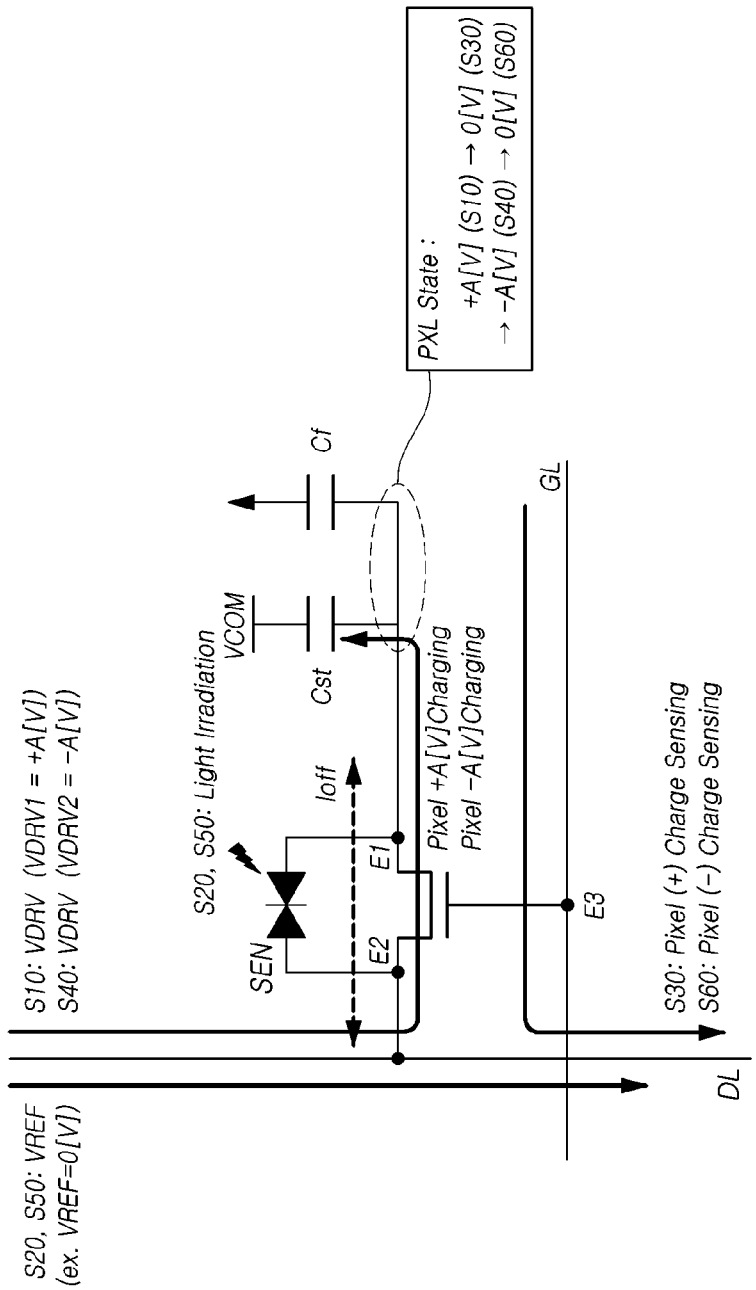
FIG. 12 is a diagram illustrating the first touch sensing method of the touch display device according to the present disclosure.
Figure 13:
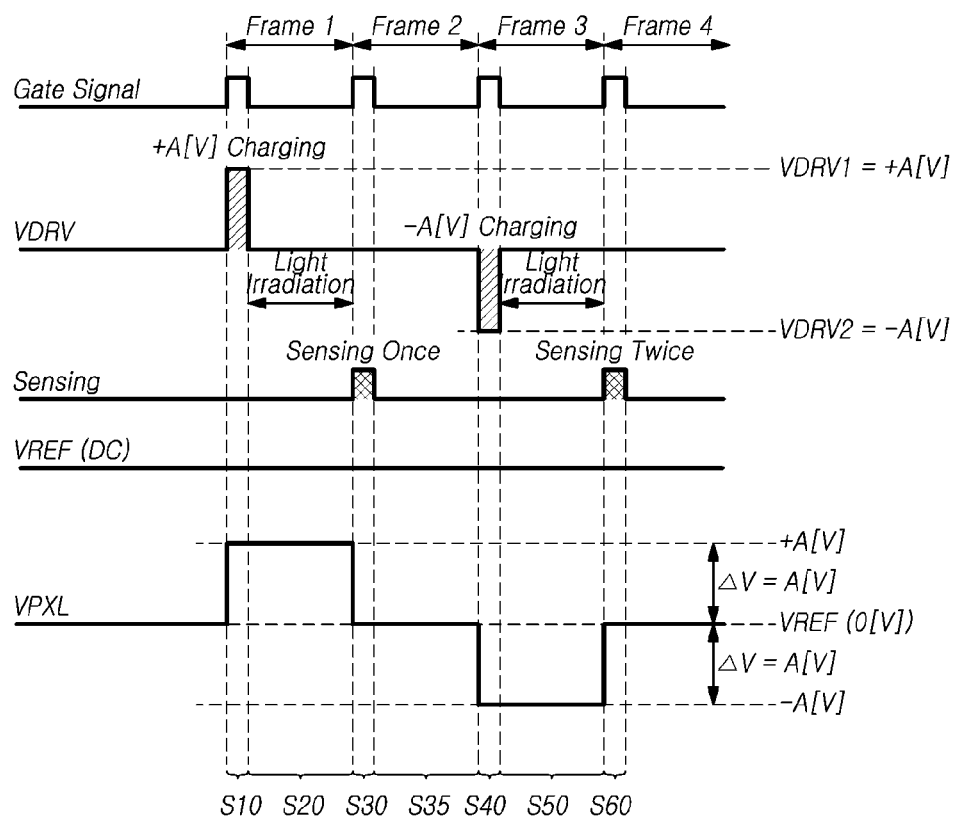
FIG. 13 is a timing diagram according to the first touch sensing method of the touch display device according to the present disclosure.

FIG. 11 is a flowchart of a first touch sensing method of the touch display device 100 according to the present disclosure, FIG. 12 is a diagram illustrating the first touch sensing method of the touch display device 100 according to the present disclosure, and FIG. 13 is a timing diagram according to the first touch sensing method of the touch display device 100 according to the present disclosure.

Referring to FIGS. 11 to 13, the first touch sensing method of the touch display device 100 may include a first pixel charging step (S10) of supplying a gate signal of a turn-on level voltage to a gate line GL and supplying a first driving voltage VDRV1 to a data line DL, a first current leakage step (S20) of supplying a gate signal of a turn-off level voltage (e.g., a low-level voltage) to the gate line GL, supplying a reference voltage VREF to the data line DL, irradiating an optical sensor SEN with light, and the like.

In the first touch sensing method, the reference voltage VREF may be a DC voltage.

As described above, when touch sensing is performed using the DC reference voltage VREF, the generation and supply of the reference voltage VREF are facilitated.

Meanwhile, a sensing timing control switch (not illustrated) may be further provided to control the sensing timing between the amplifier AMP of the touch driving circuit 810 and the display panel 110.

Such a sensing timing control switch may be a switch SW in FIG. 8 or any of other switches existing in the touch driving circuit 810.

The on/off timing of the sensing timing control switch is the timing of the sensing signal in FIG. 13.

In the above-described first pixel charge sensing step (S30), the timing control switch is turned on according to one sensing timing.

Referring to FIGS. 11 to 13, after the first pixel charging step (S10) and the first current leakage step (S20), the first pixel charge sensing step (S30) may be further performed.

Thereafter, an intermediate step (S35), a second pixel charging step (S40), a second current leakage step (S50), and a second pixel charge sensing step (S60) may be further performed.

In the first pixel charge sensing step (S30), the touch display device 100 may sense the charge between the pixel electrode and the common electrode by supplying a gate signal of a turn-on level voltage (e.g., a high-level voltage) to the gate line GL.

The touch display device 100 may proceed to an intermediate step (S35) in which a gate signal of a turn-off level voltage (e.g., a low-level voltage) is supplied to the gate line GL.

In the second pixel charging step (S40), the touch display device 100 may supply the gate signal of the turn-on level voltage to the gate line GL and may supply the second driving voltage VDRV2 to the data line DL.

In the second current leakage step (S50), the touch display device 100 may supply the gate signal of the turn-off level voltage through the gate line GL, may supply the reference voltage VREF to the data line DL, and may irradiate the optical sensor SEN with light.

In the second pixel charge sensing step (S60), the touch display device 100 may sense the charge between the pixel electrode and the common electrode by supplying the gate signal of the turn-on level voltage to the gate line GL.

In this second pixel charge sensing step (S60), the timing control switch is turned on according to two sensing timings.

As described above, after the first pixel charging step (S10), the first current leakage step (S20), and the first pixel charge sensing step (S30), touch information may be acquired through one sensing (touch sensing). In addition, after the intermediate step (S35), touch information may be acquired twice by performing sensing (touch sensing) twice through the second pixel charging step (S40), the second current leakage step (S50), and the second pixel charge sensing step (S60), in the same manner as steps S10 to S30.

Meanwhile, in the first touch sensing method, the polarity of the first driving voltage VDRV1 and the polarity of the second driving voltage VDRV2 may be opposite each other.

The polarity of the first driving voltage VDRV1 may be positive (positive polarity) and the polarity of the second driving voltage VDRV2 may be negative (negative polarity).

On the other hand, the polarity of the first driving voltage VDRV1 may be negative (negative polarity) and the polarity of the second driving voltage VDRV2 may be positive (positive polarity).

As described above, in the touch display device 100, deterioration of liquid crystal or the like may be prevented by alternately using the first driving voltage VDRV1 and the second driving voltage VDRV2, which have opposite polarities, as the driving voltage VDRV.

Meanwhile, the polarity of the first driving voltage VDRV1 and the polarity of the second driving voltage VDRV2 may be opposite each other with reference to the reference voltage VREF.

The voltage difference between the first driving voltage VDRV1 and the reference voltage VREF may correspond to the voltage difference between the reference voltage VREF and the second driving voltage VDRV2.

Referring to FIG. 13, the voltage difference between the first driving voltage VDRV1 and the reference voltage VREF may correspond to the voltage difference between the reference voltage VREF and the second driving voltage VDRV2.

For example, when the first driving voltage VDRV1 is +A [V], the second driving voltage VDRV2 is −A [V], and the reference voltage VREF is 0 [V], the voltage difference $\Delta V$ between the first driving voltage VDRV1 and the reference voltage VREF is A (=(+A)−(0)=A), and the voltage difference $\Delta V$ between the reference voltage VREF and the second driving voltage VDRV2 becomes A (=(0)−(−A)=A), and as a result, the voltage difference between the first driving voltage VDRV1 and the reference voltage VREF and the voltage difference between the reference voltage VREF and the second driving voltage VDRV2 may be the same.

As described above, since the touch display device 100 is driven using the first driving voltage VDRV1 and the second driving voltage VDRV2 which have opposite polarities with reference to the reference voltage VREF, no change occurs in the touch driving condition so that the touch sensing performance is not deteriorated.

Meanwhile, in the first touch sensing method, the first pixel charging step (S10), the first current leakage step (S20), the first pixel charge sensing step (S30), the intermediate step (S35), the second pixel charging step (S40), the second current leakage step (S50), and the second pixel charge sensing step (S60) may be performed for four frame periods.

Accordingly, the touch information may be obtained twice during the four frame periods. In other words, the touch information on the presence or absence of a touch and/or the touch position may be acquired in the entire screen area for every two frame periods, or the touch information on the fingerprint information may be acquired in the entire fingerprint sensing region for every two frame periods.

That is, when the first touch sensing method disclosed above is used, the touch sensing frequency corresponding to ½ of the display driving frequency may be obtained.

Referring to FIG. 13, while the first pixel charging step (S10), the first current leakage step (S20), the first pixel charge sensing step (S30), the intermediate step (S35), the second pixel charging step (S40), the second current leakage step (S50), and the second pixel charge sensing step (S60) are performed, the pixel voltage VPXL of the pixel electrode PXL may be changed in the order of the first driving voltage VDRV1 (e.g., +A [V]), the reference voltage VREF (e.g., 0 [V]), the second driving voltage VDRV2 (e.g., −A [V]), and the reference voltage VREF (e.g., 0 [V]).

During steps S10 to S30, variation in the pixel voltage VPXL of the pixel electrode PXL is the same as the variation in the pixel voltage VPXL of the pixel electrode PXL during steps S40 to S60, even though the polarity in the former is opposite that in the latter.

More specifically, during the first pixel charging step (S10) and the first current leakage step (S20), the pixel voltage VPXL of the pixel electrode PXL may correspond to the first driving voltage VDRV1.

During the first pixel charge sensing step (S30), the pixel voltage VPXL of the pixel electrode PXL corresponds to the reference voltage VREF.

During the intermediate step (S35), the pixel voltage VPXL of the pixel electrode PXL may correspond to the reference voltage VREF.

During the second pixel charging step (S40) and the second current leakage step (S50), the pixel voltage VPXL of the pixel electrode PXL corresponds to the second driving voltage VDRV2. In addition, the pixel voltage VPXL of the pixel electrode PXL may correspond to the reference voltage VREF during the second pixel charge sensing step (S60).

Through the voltage state variation of the pixel electrode PXL, the voltage fluctuation of the pixel electrode PXL may be made to a required degree (the degree required for touch sensing, A [V]). Through this, it is possible to sense the pixel charge (i.e., the charge charged in the capacitor Cst between the pixel electrode PXL and the common electrode CE).

Meanwhile, in the first touch sensing method described above, in order to perform touch sensing once, primary gate driving (S10, S40) for pixel charging and secondary gate driving (S30, S60) for pixel charge sensing are required. That is, in order to perform one touch sensing operation, it is necessary to supply the gate signal of the turn-on level voltage to the gate line GL twice.

However, in the case of the gate driving technique of the Gate-In-Panel (GIP) method, it is difficult to implement gate driving twice in one frame period.

Thus, according to the first touch sensing method, the sensing operation may be performed once through two gate driving operations during two frame periods.

Accordingly, the touch sensing frequency corresponds to ½ of the display driving frequency.

On the other hand, when the driving voltage VDRV is continuously applied with the same polarity on the basis of the reference voltage VREF which is a DC voltage, the deterioration of the liquid crystal may occur.

Therefore, in order to prevent the deterioration of the liquid crystal, the first driving voltage VDRV1 and the second driving voltage VDRV2, which have opposite polarities, are alternately applied in the first touch sensing method.

However, in the pixel electrode PXL, voltage variation (e.g., A) needs to occur to a degree required for touch sensing, and the voltage variation may correspond to the voltage difference between the first driving voltage VDRV1 and the reference voltage VREF, and may correspond to the voltage difference between the reference voltage VREF and the second driving voltage VDRV2.

Therefore, each of the first driving voltage VDRV1 and the second driving voltage VDRV2 requires a high voltage (e.g., +A [V], −A [V]) in order to cause a voltage variation (e.g., A) to be generated to a degree required for touch sensing at the pixel electrode PXL.

Second Touch Sensing Method

The second touch sensing method of the touch display device 100 according to the present disclosure is a touch sensing method using an AC reference voltage VREF. Using the AC reference voltage VREF, the voltage level of which swings, unlike the first touch sensing method, it is possible to perform touch driving using a low-voltage driving voltage VDRV and to acquire touch information through the touch driving, and as a result, it is possible to acquire the touch information every frame period.

The second touch sensing method according to the present disclosure will be described in more detail with reference to FIGS. 14 to 16.

Figure 14:
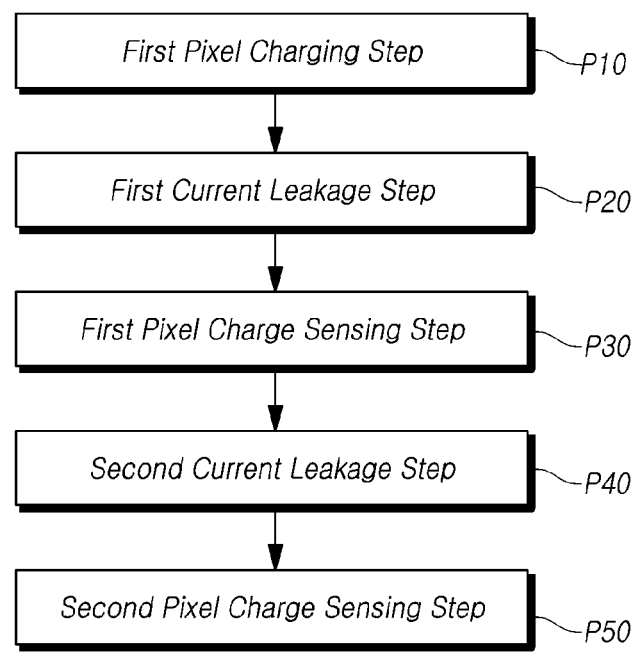
FIG. 14 is a flowchart of a second touch sensing method of the touch display device according to the present disclosure.
Figure 15:
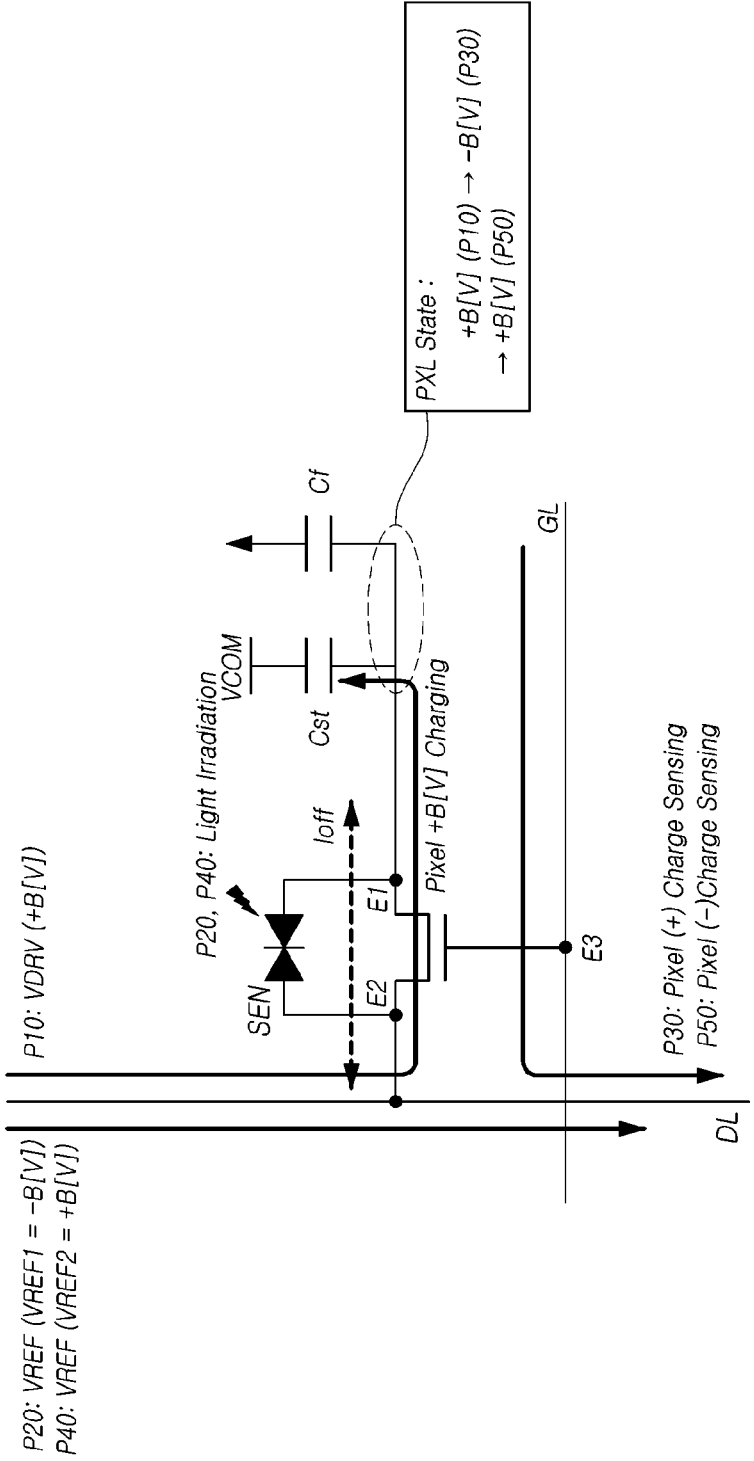
FIG. 15 is a diagram illustrating the second touch sensing method of the touch display device according to the present disclosure.
Figure 16:
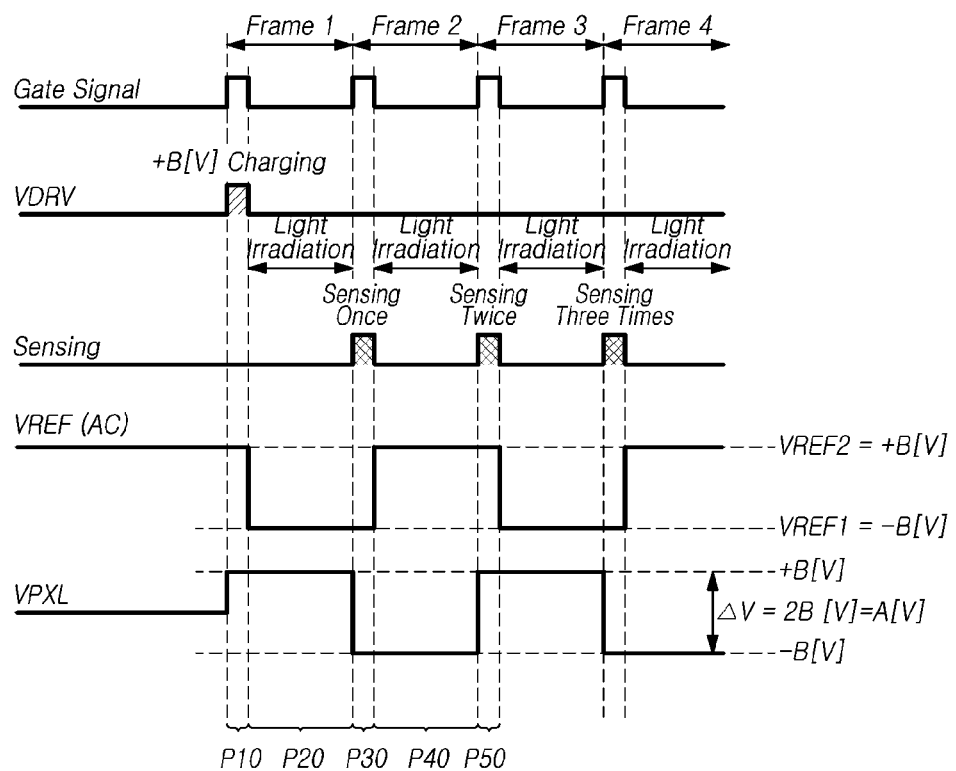
FIG. 16 is a timing diagram according to the second touch sensing method of the touch display device according to the present disclosure.

FIG. 14 is a flowchart of a second touch sensing method of the touch display device 100 according to the present disclosure, FIG. 15 is a diagram illustrating the second touch sensing method of the touch display device 100 according to the present disclosure, and FIG. 16 is a timing diagram according to the second touch sensing method of the touch display device 100 device according to the present disclosure.

Referring to FIGS. 14 to 16, the second touch sensing method of the touch display device 100 may include a first pixel charging step (P10) of supplying a gate signal of a turn-on level voltage to a gate line GL and supplying a driving voltage VDRV to a data line DL, a first current leakage step (P20) of supplying a gate signal of a turn-off level voltage to the gate line GL, supplying a reference voltage VREF to the data line DL, and irradiating an optical sensor SEN with light, and the like.

In the first pixel charging step (P10), the driving voltage VDRV may be a positive voltage.

For example, the driving voltage VDRV may be +B [V].

As described above, in the second touch sensing method, the reference voltage VREF may be an AC voltage that alternates between the first reference voltage VREF1 and the second reference voltage VREF2.

For example, the first reference voltage VREF1 is a low-level voltage and may be −B [V]. The second reference voltage VREF2 is a high-level voltage and may be +B [V].

Here, B may be the voltage value of the driving voltage VDRV used in the second touch sensing method or the voltage value of the reference voltage VREF used as the varying voltage in the second touch sensing method. B may be ½ of A corresponding to the voltage value of the driving voltage VDRV used in the first touch sensing method.

Accordingly, the second touch sensing method may make the voltage state of the pixel electrode PXL such that it is possible to prevent deterioration of the liquid crystal even when the driving voltage VDRV having the same polarity is used. In addition, the voltage value B of the driving voltage VDRV used in the second touch sensing method may be set lower than the voltage value A of the driving voltage VDRV used in the first touch sensing method.

Meanwhile, the second touch sensing method may include, after the first current leakage step (P20), a first pixel charge sensing step (P30) of sensing the charge between the pixel electrode and the common electrode by supplying the gate signal of the turn-on level voltage to the gate line GL.

In the first pixel charge sensing step (P30), the timing control switch is turned on according to one sensing timing.

As described above, a second current leakage step (S40) and a second pixel charge sensing step (P50) may be performed without a pixel charging step, directly after the first pixel charging step (P10), the first current leakage step (P20), and the first pixel charge sensing step (P30) are performed.

In the second current leakage step (P40), the touch display device 100 may supply the gate signal of the turn-off level voltage through the gate line GL, may supply the reference voltage VREF to the data line DL, and may irradiate the optical sensor SEN with light.

In the second pixel charge sensing step (P50), the touch display device 100 may sense the charge between the pixel electrode and the common electrode by supplying the gate signal of the turn-on level voltage to the gate line GL.

Meanwhile, the reference voltage VREF in the first current leakage step (P20) is the first reference voltage VREF1 (e.g., −B [V]). In addition, the reference voltage VREF in the second current leakage step (P40) is the second reference voltage VREF2 (e.g., +B [V]).

The polarity of the first reference voltage VREF1 is opposite the polarity of the driving voltage VDRV.

For example, the polarity of the first reference voltage VREF1 may be negative (negative polarity), and the driving voltage VDRV may be positive (positive polarity).

Accordingly, in the first pixel charge sensing step (P30), the voltage variation ΔV of the pixel voltage VPXL becomes 2B [V] (=driving voltage (B [V])−first reference voltage (−B [V]))=B [V]−(−B [V])).

In addition, the polarity of the second reference voltage VREF2 may be opposite the polarity (−5V) of the first reference voltage VREF1.

Accordingly, in the second pixel charge sensing step (P50), the voltage variation ΔV of the pixel voltage VPXL is 2B [V] (=the second reference voltage (B [V])−the first reference voltage−B [V])=B [V]−(−B [V])).

In this second pixel charge sensing step (P50), the timing control switch is turned on according to two sensing timings.

Using the above-described second touch sensing method, it is possible to perform sensing (touch sensing) twice even though the driving voltage VDRV is supplied only once.

In the second touch sensing method, the voltage difference (ΔV=2B) between the driving voltage (VDRV=+B [V]) and the first reference voltage (VREF1=−B [V]) may correspond to the voltage difference (ΔV=2B) between the second reference voltage (VREF2=+B [V]) and the first reference voltage (VREF1=−B [V]).

Here, the voltage difference (ΔV=2B) between the driving voltage (VDRV=+B [V]) and the first reference voltage (VREF1=−B [V]) may correspond to the voltage difference (ΔV=2B) between the second reference voltage (VREF2=+B [V]) and the first reference voltage (VREF1=−B [V]), and may correspond to voltage variation (A [V]) that is required for touch sensing and enables the touch sensing.

According to this, even though the driving voltage VDRV having a low-voltage value is used, normal touch sensing may be enabled as in the first touch sensing method.

In the above-described second touch sensing method, while the first pixel charging step (P10), the first current leakage step (P20), the first pixel charge sensing step (P30), the second current leakage step (P40), and the second pixel charge sensing step (P50) are performed, the pixel voltage VPXL of the pixel electrode PXL may be changed in the order of the driving voltage (VDRV=+B [V]), the first reference voltage (VREF1=−B [V]), and the second reference voltage (VREF2=+B [V]).

In other words, during the first pixel charging step (P10) and the first current leakage step (P20), the pixel voltage VPXL of the pixel electrode PXL may correspond to the driving voltage VDRV.

During the first pixel charge sensing step (S30) and the second current leakage step (P40), the pixel voltage VPXL of the pixel electrode PXL may correspond to the first reference voltage VREF1.

During the second pixel charge sensing step (P50), the pixel voltage VPXL of the pixel electrode PXL may correspond to the second reference voltage VREF2.

Therefore, according to the second touch sensing method, a voltage variation to a degree required for touch sensing may be generated in the pixel electrode PXL even though a low driving voltage VDRV is used.

Meanwhile, in the above-described second touch sensing method, the first pixel charging step (P10), the first current leakage step (P20), the first pixel charge sensing step (P30), the second current leakage step (P40), and the pixel charge sensing step (P50) are performed for two frame periods, so that touch sensing can be performed twice. In other words, the touch information on the presence or absence of a touch and/or the touch position may be acquired in the entire screen area for every frame period, or the touch information on the fingerprint information may be acquired in the entire fingerprint sensing region for every frame period.

That is, according to the second touch sensing method, the touch display device 100 is capable of performing sensing once for every frame period. Accordingly, the touch sensing frequency may correspond to the display driving frequency.

As described above, the touch display device 100 has a touch sensing system that provides a touch sensing method in an optical manner and includes, for this purpose, a driving circuit and a light irradiation device 1000.

The driving circuit of the touch sensing system may supply the driving voltage VDRV to the data line DL when the gate signal of the turn-on level voltage is supplied to the gate line GL, and may supply the reference voltage VREF to the data line DL when the gate signal of the turn-off level voltage is supplied to the gate line GL and the optical sensor SEN electrically connected between a source node and a drain node of a switching transistor SWT is irradiated with light.

This driving circuit may be the touch sensing circuit 140, the touch driving circuit 810, or the integrated driving integrated circuit 800 in FIG. 8 and may further include a gate driving circuit 130 in some cases.

The light irradiation device 1000 is capable of irradiating the optical sensor SEN with light at a light irradiation timing.

According to the present disclosure described above, it is possible to accurately sense a touch position and/or a fingerprint in an optical manner.

According to the present disclosure, it is possible to accurately sense a touch position and/or a fingerprint without being influenced by parasitic capacitance.

According to the present disclosure, it is possible to efficiently perform the driving for the sensing of a touch position and/or a fingerprint.

According to the present disclosure, low-voltage driving is enabled for sensing a touch location and/or a fingerprint.

According to the present disclosure, it is possible to increase the touch sensing frequency for sensing a touch position and/or a fingerprint.

According to the present disclosure, by utilizing the pixel structure as a touch pixel structure, it is possible to accurately sense a touch position and/or a fingerprint without separately including a touch sensor having a large size.

According to the present disclosure, it is possible to perform a switching function for driving a display and a sensor function for sensing a touch position and/or a fingerprint using a single structure.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A touch display device comprising:
    a display panel in which a data line and a gate line are arranged and a pixel electrode is disposed in a pixel region;
    a switching transistor controlled by a gate signal applied to a gate node through the gate line, and electrically connected between the data line and the pixel electrode;
    an optical sensor having both ends connected to a source node and a drain node of the switching transistor;
    a gate driving circuit supplying the gate signal to the gate line; and
    a touch sensing circuit electrically connected to the data line and configured to acquire touch information in response to a current flowing in the data line,
    wherein the touch display device operates a touch sensing mode during a touch sensing mode period including first and second periods, a gate signal of a turn-on level voltage is supplied to the gate line and a driving voltage is supplied to the data line during the first period, and a gate signal of a turn-off level voltage is supplied to the gate line, a reference voltage is supplied to the data line, and the optical sensor is irradiated with light during the second period.

2. The touch display device of claim 1, wherein, when the optical sensor is not irradiated with the light at a time of supplying the gate signal of the turn-off level voltage to the gate line, no current flows in the data line, or current flows at a predetermined level or less.

3. The touch display device of claim 1, wherein the light is infrared light or visible light.

4. The touch display device of claim 1, wherein the touch information is fingerprint information or touch position information.

5. The touch display device of claim 1, wherein the pixel region including the optical sensor is disposed in an entire region of the display panel.

6. The touch display device of claim 1, wherein the pixel region including the optical sensor is disposed in a partial region of the display panel.

7. The touch display device of claim 1, further comprising a light irradiation device configured to irradiate the optical sensor with the light at a light irradiation timing.

8. The touch display device of claim 1, wherein the reference voltage is a DC voltage.

9. The touch display device of claim 8, wherein the driving voltage alternates between a first driving voltage and a second driving voltage, which have opposite polarities.

10. The touch display device of claim 9, wherein the pixel electrode alternates among a state in which the first driving voltage is applied thereto, a state in which the reference voltage is applied thereto, a state in which the second driving voltage is applied thereto, and the state in which the reference voltage is applied thereto.

11. The touch display device of claim 8, wherein the touch display device has a touch sensing frequency corresponding to ½ of a display driving frequency.

12. The touch display device of claim 1, wherein the reference voltage is an AC voltage alternating between a first reference voltage and a second reference voltage.

13. The touch display device of claim 12, wherein the driving voltage is supplied only once during an initial frame period with a same polarity.

14. The touch display device of claim 13, wherein the pixel electrode is applied with the driving voltage and alternates between a state in which the first reference voltage is applied thereto and a state in which the second reference voltage is applied thereto.

15. The touch display device of claim 12, wherein the touch display device has a touch sensing frequency corresponding to a display driving frequency.

16. The touch display device of claim 1, wherein the touch sensing circuit includes a touch driving circuit configured to detect a current flowing in the data line or a charge or a signal corresponding to the current during the touch sensing mode period, and a touch controller configured to acquire touch information based on a result of detection by the touch driving circuit.

17. The touch display device of claim 16, further comprising:
    a data driving circuit supplying an image signal to the data line during a display mode period,
    wherein the touch driving circuit and the data driving circuit are implemented as a single driving integrated circuit.

18. A touch sensing method of a touch display device including a display panel in which a data line and a gate line are arranged, and which includes a pixel region in which a pixel electrode defined by the data line and the gate line and a switching transistor are disposed, the switching transistor being controlled by a gate signal applied to a gate node through the gate line, and being electrically connected between the data line and the pixel electrode, the touch sensing method comprising:
    a first pixel charging step of supplying a gate signal of a turn-on level voltage to the gate line and supplying a first driving voltage to the data line; and
    a first current leakage step of supplying a gate signal of a turn-off level voltage to the gate line, supplying a reference voltage to the data line, and irradiating an optical sensor, both ends of which are respectively connected to a source node and a drain node of the switching transistor, with light.

19. The touch sensing method of claim 18, wherein the reference voltage is a DC voltage.

20. The touch sensing method of claim 19, wherein, after the first current leakage step, the touch sensing method further comprises:
    a first pixel charge sensing step of sensing a charge between the pixel electrode and a common electrode by supplying a gate signal of a turn-on level voltage to the gate line;

an intermediate step of supplying the gate signal of the turn-off level voltage to the gate line;

a second pixel charging step of supplying the gate signal of the turn-on level voltage to the gate line and supplying a second driving voltage to the data line;

a second current leakage step of supplying the gate signal of the turn-off level voltage through the gate line, supplying the reference voltage to the data line, and irradiating the optical sensor with the light; and a second pixel charge sensing step of sensing a charge between the pixel electrode and the common electrode by supplying the gate signal of the turn-on level voltage to the gate line.

21. The touch sensing method of claim 20, wherein the first and second driving voltages have a polarity opposite with each other.

22. The touch sensing method of claim 20, wherein a voltage difference between the first driving voltage and the reference voltage corresponds to a voltage difference between the reference voltage and the second driving voltage.

23. The touch sensing method of claim 20, wherein the first pixel charging step, the first current leakage step, the first pixel charge sensing step, the intermediate step, the second pixel charging step, the second current leakage step, and the second pixel charge sensing step are performed for four frame periods, and touch information is acquired twice for the four frame periods.

24. The touch sensing method of claim 20, wherein, while the first pixel charging step, the first current leakage step, the first pixel charge sensing step, the intermediate step, the second pixel charging step, the second current leakage step, and the second pixel charge sensing step are performed, a pixel voltage of the pixel electrode is changed in an order of the first driving voltage, the reference voltage, the second driving voltage, and the reference voltage.

25. The touch sensing method of claim 18, wherein the reference voltage is an AC voltage alternating between a first reference voltage and a second reference voltage.

26. The touch sensing method of claim 25, wherein after the first current leakage step, the touch sensing method further comprises:

a first pixel charge sensing step of sensing a charge between the pixel electrode and a common electrode by supplying the gate signal of the turn-on level voltage to the gate line;

a second current leakage step of supplying the gate signal of the turn-off level voltage through the gate line, supplying the reference voltage to the data line, and irradiating the optical sensor with the light; and a second pixel charge sensing step of sensing a charge between the pixel electrode and the common electrode by supplying the gate signal of the turn-on level voltage to the gate line, wherein the reference voltage in the first current leakage step is a first reference voltage, the reference voltage in the second current leakage step is a second reference voltage, a polarity of the first reference voltage is opposite a polarity of the first driving voltage, and a polarity of a second driving voltage is opposite the polarity of the first reference voltage.

27. The touch sensing method of claim 26, wherein a voltage difference between the first driving voltage and the first reference voltage corresponds to a voltage difference between the second reference voltage and the first reference voltage.

28. The touch sensing method of claim 26, wherein the first pixel charging step, the first current leakage step, the first pixel charge sensing step, the second current leakage step, and the second pixel charge sensing step are performed for two frame periods, and touch information is acquired twice for the two frame periods.

29. The touch sensing method of claim 26, wherein, while the first pixel charging step, the first current leakage step, the first pixel charge sensing step, the second current leakage step, and the second pixel charge sensing step are performed, a pixel voltage of the pixel electrode is changed in an order of the first driving voltage, the first reference voltage, and the second reference voltage.

* * * * *